United States Patent
Billings

(10) Patent No.: US 10,268,168 B2
(45) Date of Patent: *Apr. 23, 2019

(54) ADAPTIVE CONTROL SYSTEMS AND METHODS FOR BUILDINGS

(71) Applicant: Edison Labs, Inc., San Francisco, CA (US)

(72) Inventor: Colin Billings, San Francisco, CA (US)

(73) Assignee: Edison Labs, Inc., San Francisco, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 15/649,669

(22) Filed: Jul. 14, 2017

(65) Prior Publication Data
US 2018/0120788 A1 May 3, 2018

Related U.S. Application Data

(60) Provisional application No. 62/416,281, filed on Nov. 2, 2016.

(51) Int. Cl.
*G05B 13/02* (2006.01)
*G05B 13/04* (2006.01)
(Continued)

(52) U.S. Cl.
CPC ......... *G05B 13/026* (2013.01); *G05B 13/024* (2013.01); *G05B 13/0255* (2013.01); *G05B 13/0265* (2013.01); *G05B 15/02* (2013.01); *G05B 19/048* (2013.01); *H02J 13/0006* (2013.01); *G05B 13/048* (2013.01); *G05B 2219/2642* (2013.01); *G06N 99/005* (2013.01)

(58) Field of Classification Search
CPC .. G05B 13/026; G05B 15/02; G05B 13/0265; G05B 13/024; G05B 19/048; G05B 13/0255; G05B 2219/2642; G05B 13/048; H02J 13/0006; G06N 99/005
USPC .......................................... 700/17, 286–296
See application file for complete search history.

(56) References Cited

U.S. PATENT DOCUMENTS 5,579,221 A 11/1996 Mun
7,948,968 B2 5/2011 Voit
(Continued)

*Primary Examiner* — Ziaul Karim
(74) *Attorney, Agent, or Firm* — Paul Davis

(57) ABSTRACT

A system is provided for controlling a first switch terminal or equivalent of a building occupied by one or more building occupant, the system includes a plurality of switch terminal or equivalent parameters relative to the building, a first computer system is coupled to the first switch terminal or equivalent of the building at a first location of the building. The first computer system runs on at least one platform, a first plurality of sensors is coupled to the first switch terminal and the first computer system. At least a portion of the sensors provide signal data to the first computer system, the first computer system produces a command or data output that relates to at least one of: a command output for a local control system, a command output for a different system, a data output for a different system, a command output for a non-local device or a data output that is a non-local device, each of an output including learned data from that is based on a machine intelligence from previous data collected about patterns of a building occupant and used to provide an adaptive control system for the building.

21 Claims, 17 Drawing Sheets

(51) Int. Cl.
*G05B 15/02* (2006.01)
*G06N 99/00* (2010.01)
*H02J 13/00* (2006.01)
*G05B 19/048* (2006.01)

(56) References Cited

U.S. PATENT DOCUMENTS

| | | |
|---|---|---|
| 8,086,352 B1 | 12/2011 | Elliott |
| 8,610,376 B2 | 12/2013 | Chemel |
| 2001/0010032 A1 | 7/2001 | Ehlers |
| 2005/0090915 A1* | 4/2005 | Geiwitz ................ G05B 15/02 700/90 |
| 2007/0273307 A1 | 11/2007 | Westrick |
| 2008/0265799 A1 | 10/2008 | Sibert |
| 2009/0157529 A1 | 6/2009 | Ehlers |
| 2010/0076615 A1 | 3/2010 | Daniel |
| 2010/0145536 A1* | 6/2010 | Masters ................ H02J 3/14 700/292 |
| 2010/0264846 A1 | 10/2010 | Chemel |
| 2012/0265586 A1 | 10/2012 | Mammone |
| 2013/0173926 A1 | 7/2013 | Morese |
| 2013/0201316 A1* | 8/2013 | Binder ................ H04L 67/12 348/77 |
| 2014/0012821 A1 | 1/2014 | Fuhrmann |
| 2014/0285090 A1 | 9/2014 | Chemel |
| 2014/0309864 A1* | 10/2014 | Ricci ................ H04W 4/21 701/36 |
| 2015/0168002 A1 | 6/2015 | Plitkins |
| 2016/0183030 A1 | 6/2016 | Cregg |
| 2017/0038787 A1* | 2/2017 | Baker ............. H05B 37/0272 |
| 2017/0084143 A1 | 3/2017 | Acera |
| 2017/0115022 A1* | 4/2017 | Grosshart ........... F24F 11/0012 |
| 2017/0285433 A1 | 10/2017 | Shrivastava |

\* cited by examiner

ADAPTIVE CONTROL SYSTEMS AND METHODS FOR BUILDINGS

CROSS-REFERENCE TO RELATED APPLICATIONS

This present application claims priority from U.S. Provisional Patent Application Ser. No. 62/416,281, filed on Nov. 2, 2016, entitled: "SYSTEM FOR LOAD CONTROLLING DEVICES" which is incorporated herein by reference.

BACKGROUND

Field of the Invention

This invention relates generally to computer controlled systems and methods, and more particularly to adaptive control systems and methods for a building.

Brief Description of the Related Art

Electronic control over complex systems has been limited primarily to industrial applications, and occasionally commercial applications. Such electronic control systems usually required extensive and costly equipment, as well as technically trained operators. However, as consumer products and systems become more and more complex, untrained people in home environments have been increasingly desirous of obtaining a sophisticated electronic control system for enabling an easy to use control over such home products and systems. Many such products and systems are also increasingly being used in commercial environments, such as electronic conference rooms, in which it is also desirable to provide an easy to use control system for use by individuals who are often not skilled in technological arts.

Many building automation systems are generally built around a small control box which is connected by means of existing household AC wiring, to one or more modules distributed throughout the home. The appliances and/or lights to be controlled are in turn connected to the modules and may thus be controlled from the control console by the homeowner. The main advantage of such "power-line carrier" home control systems is that they are low in cost and utilize existing home wiring. However, such power-line carrier control systems can be easily disrupted by internal circuitry or outside environmental electrical disturbances, such as weather conditions. In addition, such systems allow the control of only a relatively limited number of types of electrical appliances, namely, lights and small electrical appliances. They do not, however, allow for any sophisticated platforming functions other than perhaps a time on and time off feature. This provides power-line carrier control systems are of relatively limited utility for building automation purposes.

More sophisticated building automation systems are generally built around a platform able microprocessor connected to a local bus which accepts a limited number of input/output control cards. Such systems may allow the connection of building occupant control devices such as a keypad or a touchscreen for inputting control commands to the home automation system. However, such systems have a predetermined limited number of how many devices and building occupant interfaces the system can support.

SUMMARY

An object of the present invention is to provide computer controlled systems for buildings.

Another object of the present invention is to provide adaptive control systems and methods for a building A further object of the present invention is to provide adaptive control systems and methods for a building that includes a plurality of switch terminals.

These and other objects of the present invention are achieved in a system for controlling a first switch terminal of a building occupied by one or more building occupant. The system includes a plurality of switch terminal parameters relative to the building. A first computer system is coupled to the first switch terminal of the building at a first location of the building. The first computer system runs on at least one platform. A first plurality of sensors is coupled to the first switch terminal and the first computer system. At least a portion of the sensors provide signal data to the first computer system. The first computer system produces a command or data output that relates to at least one of: a command output for a local control system, a command output for a different system, a data output for a different system, a command output for a non-local device or a data output that is a non-local device, each of an output including learned data from that is based on machine intelligence from previous data collected about patterns of a building occupant.

DETAILED DESCRIPTION

Definitions

Figure 1:
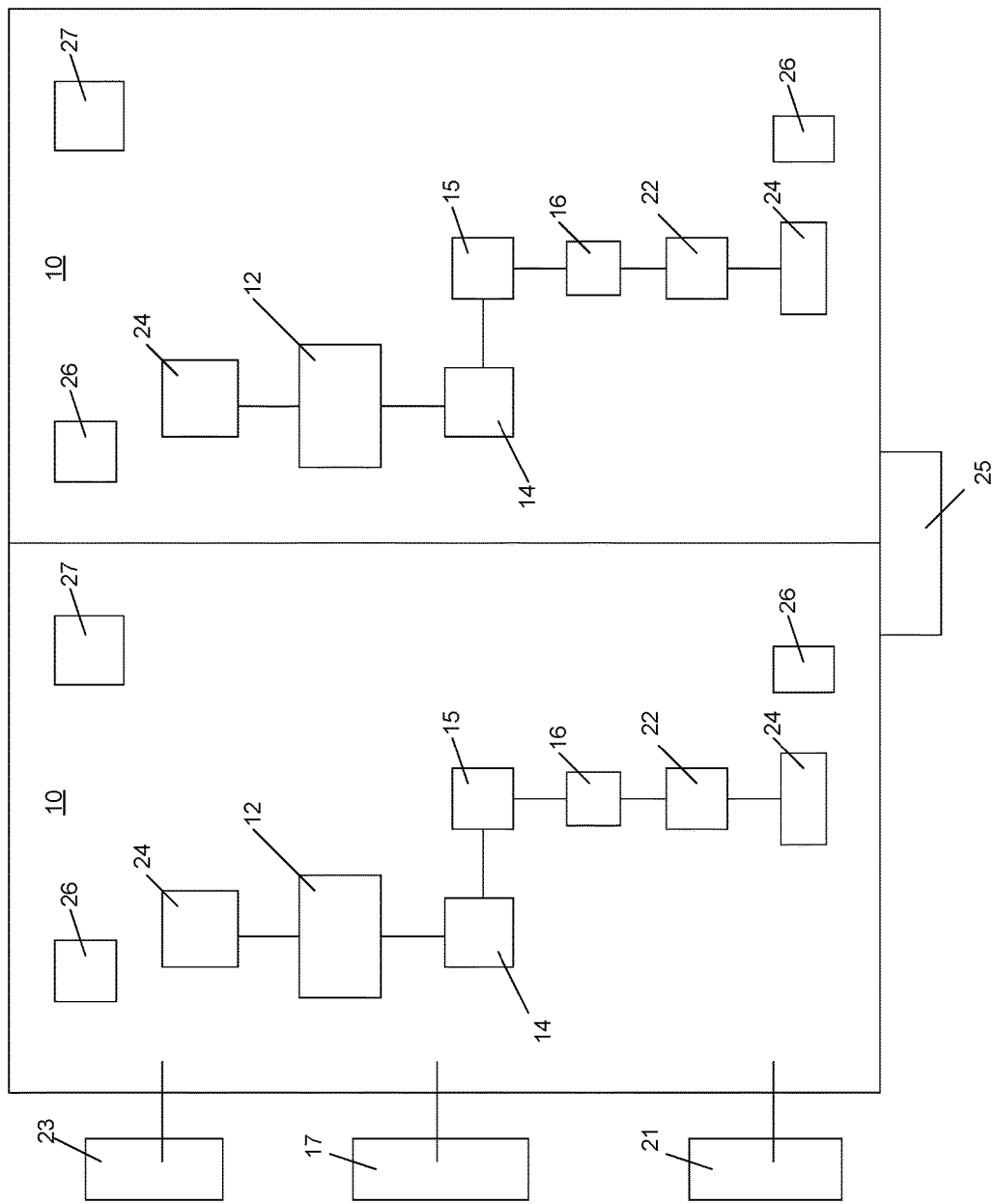
FIG. 1 illustrates one embodiment of a building adaptive control system of the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical platform will include calls to hardware components (such as I/O devices), which typically requires the execution of drivers. The drivers may or may not be considered part of the engine, but the distinction is not critical. As used herein, the term database is used broadly to include any known or convenient means for storing data, whether centralized or distributed, relational or otherwise.

As used herein a mobile devices include, but are not limited to, a cell phone, such as Apple's iPhone®, other portable electronic devices, such as Apple's iPod Touches®. Apple's iPads®, and mobile devices based on Google's Android® operating system, and any other portable electronic device that includes software, firmware, hardware, or a combination thereof that is capable of at least receiving a wireless signal, decoding if needed, and exchanging information with a server to send and receive cultural information data including survey data. Typical components of mobile devices may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain platforms, applications, and/or an operating system for the mobile devices.

As used herein, the term "computing device" is a general purpose device that can be platformed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "Internet" is a global system of interconnected computer networks that use the standard Internet protocol suite (TCP/IP) to serve billions of building occupants worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture.

As used herein, the term "extranet" is a computer network that allows controlled access from the outside. An extranet can be an extension of an organization's intranet that is extended to building occupants outside the organization in isolation from all other Internet building occupants. An extranet can be an intranet mapped onto the public Internet or some other transmission system not accessible to the general public, but managed by more than one company's administrator(s). Examples of extranet-style networks include but are not limited to: LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote building occupants using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to: A LAN A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP). For purposes of the present invention, the Internet, extranets and intranets collectively are referred to as ("Network Systems").

As used herein "load management" is defined as the process of balancing the supply of electricity with an electrical load by adjusting or controlling the load rather than the power station output. As used herein an electrical load is an electrical component or portion of a circuit that consumes electric power. This is opposed to a power source, such as a battery or generator, which produces power. In electric power circuits examples of loads are appliances and lights. The term may also refer to the power consumed by a circuit. Electrical load includes a system or device connected to a signal source, whether or not it consumes power. If an electric circuit has an output port, a pair of terminal 12s that produces an electrical signal, the circuit connected to this terminal (or its input impedance) is the load. An electrical load can affect the performance of circuits with respect to output voltages or currents, such as in sensors, voltage sources, and amplifiers.

As used herein a "building" is anything built or constructed including but not limited to a structure that is a relatively permanently enclosed construction over a plot of land, having a roof and usually windows. Examples of buildings include but are not limited to: agricultural buildings, commercial buildings, residential buildings, medical buildings, educational buildings, government buildings, industrial buildings, military buildings, parking structures and storage, religious buildings, transport buildings, and the like.

As used herein "integrated" means composed to form a complete or coordinated entity that can be combined, coupled to, coordinating, separate elements coupled to each other and the like.

As used herein "machine learning" is artificial intelligence and relating to construction and studies of systems that can learn from data. Machine learning can give computation devices including but not limited to computers with an ability to learn without being explicitly platformed. And can evolve from pattern recognition and computational learning theory in artificial intelligence. As a non-limiting example machine learning explores the study and construction of algorithms that can learn from and make predictions on data. As a non-limiting example these algorithms can overcome following strictly static platform instructions by making data-driven predictions or decisions and can build a model from sample inputs. Platforms include computational statistics, as well as mathematical optimization. Machine learning can be unsupervised and be used to learn and establish baseline behavioral profiles for various entities and then used to find meaningful anomalies. For purposes of the present invention machine learning collectively is called "machine intelligence As used herein "local installed platform" means" a software platform that can be a local installed platform is software that works in combination with the hardware. In one embodiment the local installed platform is in communication with raw data that can be received from a sensor, a command input or data input to generate device behaviors. As non-limiting examples the device behaviors can be commands and/or data outputs.

Referring to FIG. 1 in one embodiment a building adaptive control system 10 for a building, (hereafter system "10") is provided for controlling a first switch terminal 12 or equivalent of a building 13 occupied by one or more building occupants. As used herein switch terminal or equivalent includes both the switch terminal 12 or equivalent includes switch terminal system, hereafter collectively called ("switch terminal 12 or equivalent"). The system 10 includes a plurality of switch terminal parameters relative to the building 13. A first computer system 14 is coupled to the first switch terminal 12 or equivalent of the building 13 at a first location of the building. The first computer system 14 runs on at least one platform. A first plurality of sensors 15 are coupled to the first switch terminal 12 or equivalent and the first computer system 14. At least a portion of the sensors 15 provide signal data to the first computer system 14. The first computer system 14 produces a command or data output that relates to at least one of: a command output for a local control system, a command output for a different system, a data output for a different system, a command output for a non-local device or a data output that is a non-local device, each of an output including learned data from that is based on a machine intelligence from previous data collected about patterns of a building occupant.

In various embodiments, switch terminal 12 or equivalent is configured to provide one or more platforms for an occupant of a building 13 using machine learning relative to a switch terminal 12 or equivalent in response to an activity or a behavior of a building occupant or a characteristic of the building itself. (Collectively a "building occupant switch terminal parameter".

In one embodiment an intelligent lighting system 10 is provided. In one embodiment the lighting system 10 includes a first switch terminal 12 or equivalent, or a device that can provide communication between different components of system 10 (hereafter an "equivalent"). As a non-limiting example the building 13 is occupied by one or more building occupants. In one embodiment the system 10 includes a plurality of switch terminal 12 or equivalent parameters relative to the building. In one embodiment a first computer system 14 is coupled to the first switch terminal 12 or equivalent of the building 13 at a first location of the building 13. As a non-limiting example the first computer system 14 with one or more software platforms, hereafter platform, that runs on a computer system 14. System 10 is the first or local system, and it can be coupled to one or more non-local or third party systems 10.

In one embodiment a first plurality of sensors (collectively 15) are coupled to the first switch terminal 12 or equivalent and the first computer system 14. All or a portion of the sensors 15 can be internal or external to switch terminal 12 or equivalent. As a non-limiting example each or a portion of the sensors 15 is configured to provide signal data to the first computer system 14. As a non-limiting example suitable sensors 15 including but not limited to IR sensors; image sensors; ambient light sensors; microphones; proximity sensors; RGB sensors; humidity sensors; temperature sensors; carbon monoxide sensors; radar based sensors; laser measuring sensors; RF sensors; accelerometers) and the like;

The first computer system 14 produces a command or data output that relates to at least one of: a command output for a local control system 16, a command output for a different control system, also 16, which can be included in system 10 or second system 10, a data output for a second system 10, a command output for a non-local device 18 that is not included in system 10, and a data output that is for a non-local device 18. In one embodiment each or at least a portion of an output includes learned data from that is based on machine intelligence from previous data collected about patterns of a building occupant and the building itself.

In one embodiment device 18 is a hardware or software component. Device 18 can be a local device 18 at the first system 10 or a non-local device 18 that is external to first system 10 and can be included in a second system (third party system), also referred to as system 10. In one embodiment second system 10 is in communication with system 10, or at least a portion of second system 10 is in communication with system 10.

In one embodiment a device 18 is a physical or software element that provides for communication and interaction in system 10. As a non-limiting example devices include but are not limited to: gateways, routers, network bridges, modems, wireless access points, networking cables, line drivers, switches, hubs, and repeaters; and may also include hybrid network devices such as multilayer switches, protocol converters, bridge routers, proxy servers, firewalls, network address translators, multiplexers, network interface controllers, wireless network interface controllers, ISDN terminal adapters, other related hardware and the like.

Figure 4:
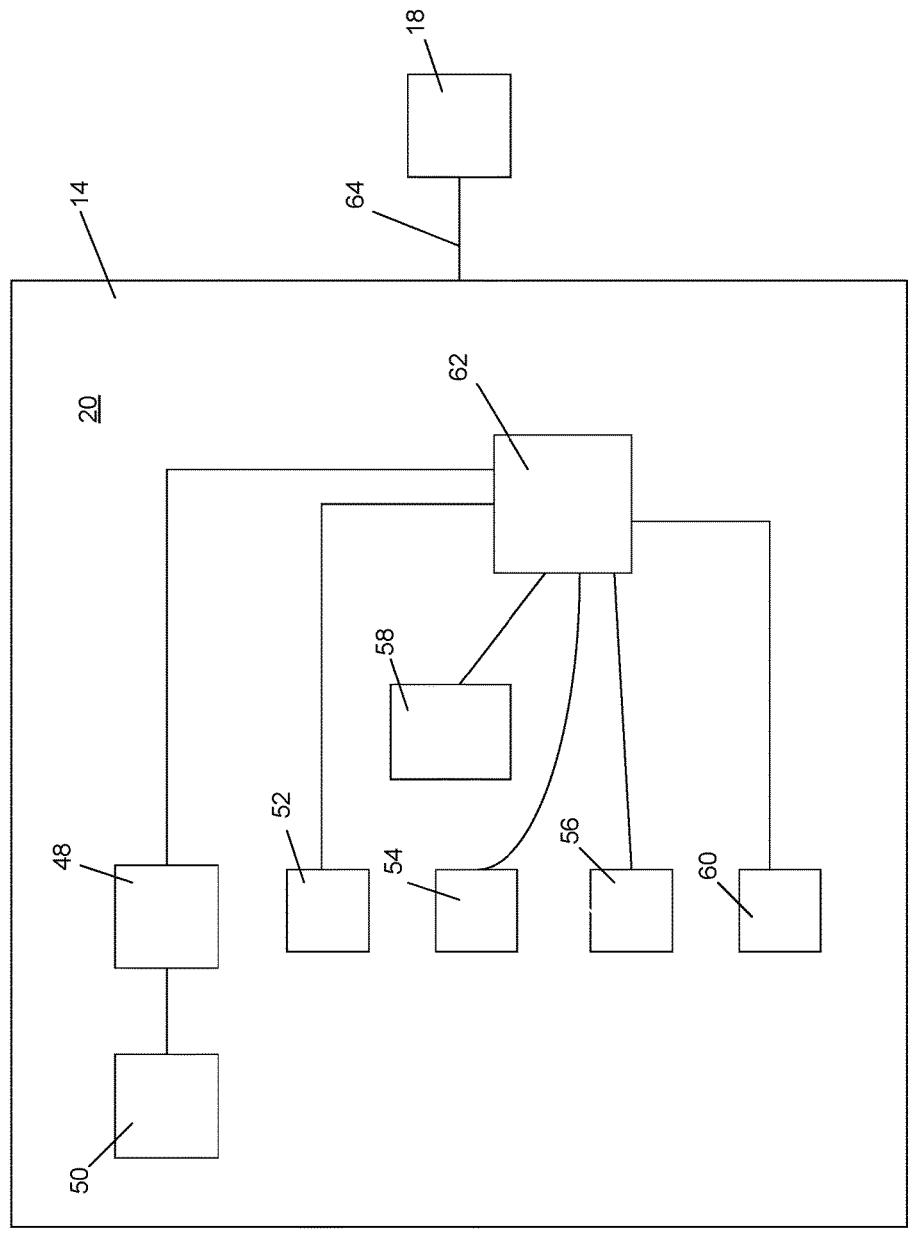
FIG. 4 illustrates one embodiment of an integrated computing device that can be used with the present invention.

In one embodiment at least one interface 20, FIG. 4, is coupled to the first switch terminal 12 or equivalent and the first computer system 14 is configured to receive a command input. In one embodiment, at least one building occupant interface 20, hereafter interface 20, is a point of interaction between a computer system 14 and humans. In one embodiment interface 20 includes any number of modalities of interaction (such as graphics, sound, position, movement, etc.) where data or other information is transferred between the building occupant and computer system 14. As non-limiting examples an interface 20 includes but it not limited to: at least one of: a touch interface, a voice interface, a communication interface 20, a wireless interface 20, a wireless radio interface 20 and the like.

As a non-limiting example the building occupant enters a change in a switch terminal 12 or equivalent parameter using the at least one interface 20. In one embodiment the first switch terminal 12 or equivalent is configured to receive from a second switch terminal 12 or equivalent a data output that is used to create a command output that relates to the first switch terminal 12 or equivalent or a non-local device 18.

In one embodiment the signal data is raw signal data. In one embodiment at least a portion of the sensors 15 receive raw sensor data.

As a non-limiting example the building occupant is a person who has access rights to the building 13. In one embodiment the building occupant does not occupy the building 13 at all times of a selected time period. In one embodiment the building occupant enters and exits the building 13.

In one embodiment a command is an instruction for a specific device 18 to take an action.

As a non-limiting example the specific device 18 is the switch terminal 12 or equivalent.

As non-limiting examples the command is provided from at least one of: a mobile device 23, a cloud system 21, an input to the specific device 18 and the like. In one embodiment the command is provided by using a touch screen, also referred to as 20, of a switch terminal 12 or equivalent that serves as a means for input of data, a command and the like.

In one embodiment the command is provided by the building occupant.

In one embodiment a data input is provided to at least a portion of the sensors 15.

As non-limiting examples the data input is selected from at least one of: a processed sensor input from another device 18 that is relevant to the system 10 In one embodiment, another device 18 can be included in system 10, second system 10, and the like. As non-limiting examples data can come from another device 18, which can be from system 10 or a separate system 10. Input can be entered through at least one: a building occupant's voice, a touch screen display, a touch sensor, a physical mechanism, components used to connect computers or other electronic devices together so that they can share files or resources, and the like.

In one embodiment an intelligent lighting system 10 is provided. In one embodiment the intelligent lighting system 10 controls a first switch terminal 12 or equivalent of a building 13 occupied by one or more building occupants. In one embodiment the system 10 includes a plurality of switch terminal 12 or equivalent parameters relative to the building 13. In one embodiment a first computer system 14 is coupled to the first switch terminal 12 or equivalent of the building at a first location of the building. As a non-limiting example the first computer system 14 runs on at least one platform.

In one embodiment a first plurality of sensors 15 are coupled to the first switch terminal 12 or equivalent and the first computer system 14. As a non-limiting example each or a portion of the sensors 15 is configured to provide signal data to the first computer system 14. The first computer system 14 produces a command or data output that relates to at least one of: a command output for a local device 18, a command output from a third party system 10, a command output for a non-local device 18 and a data output that is a non-local device 18. In one embodiment each or at least a portion of an output includes learned data from that is based on machine intelligence from previous data collected about patterns of a building occupant.

As a non-limiting example the building occupant enters a change in a switch terminal 12 or equivalent parameter using the at least one interface 20. In one embodiment the first switch terminal 12 or equivalent is configured to receive from a second switch terminal 12 or equivalent a data output that is used to create a command output that relates to the first switch terminal 12 or equivalent or a non-local device.

In one embodiment the signal data is raw signal data. In one embodiment at least a portion of the sensors receive raw sensor data.

As a non-limiting example the building occupant is a person who has access rights to the building 13. In one embodiment the building occupant does not occupy the building 13 at all times of a selected time period. In one embodiment the building occupant enters and exits the building 13.

In one embodiment a command is an instruction for a specific device 18 to take an action. As a non-limiting example the specific device 18 is the switch terminal 12 or equivalent.

As non-limiting examples the command is provided from at least one of: a mobile device, a cloud system, a third party system, or an input to the specific device In one embodiment the command is provided using a touch screen of a switch terminal 12 or equivalent interface 20.

In one embodiment the command is provided by the building occupant.

In one embodiment a data input is provided to at least a portion of the sensors 15.

As non-limiting examples the data input is selected from at least one of: a processed sensor input from another device 18 that is relevant to the system 10, a third party system 10 in communication with the first system 10, and the like.

As non-limiting examples the data input is selected from at least one of the following: a processed sensor 15 input from another device 18 that is within the local system 10; a processed sensor 15 input from another device 18 that is part of a separate system 10 (third party system), a processes sensor 15 input from another device 18 that may be relevant to system 10, a third party system 10 in communication with the first system 10, and the like. As non-limiting examples devices can include: switch terminals 12; electrical outlets; light sources, lamps; thermostats; cameras; smoke detectors; door locks; smart televisions; set top boxes; routers; wireless access points; mobile devices 23 and the like.

As non-limiting examples the output command is to the switch terminal 12 or equivalent. In one embodiment the output command is to a system 10 device 18 other than the switch terminal 12 or equivalent.

In one embodiment the output command is provided to the second system 10.

As non-limiting examples the data input can be any data and can includes at least one of: a building occupant's presence or use in a room; a light level; system information relative to a switch terminal 12 or equivalent. As non-limiting examples the data input can be any data and can include at least one of: a measurement; a classification; a determination based on logic; an announcement with regard to any aspect of a state being held, and the like.

As non-limiting examples the data input can be any data that can relate to at least one of: the environmental conditions of an area inside or proximate to a building 13; the number and identity of occupants inside or proximate to the building 13; the activities of building occupants; the performance and state of the electrical system of a building; the performance and state of any power supply connected to the building 13; the functions of any system within the building 13 and the like.

In another embodiment the intelligent lighting system controls at least two switch terminals 12 of the building 13 occupied by one or more building occupants and the system including a plurality of switch terminal 12 or equivalent parameters relative to the building 13. A first computer system 14 coupled to a first switch terminal 12 or equivalent of the building 13 at a first location of the building 13, the first computer system 14 running on at least one platform. A second computer system 14 is coupled to a second switch terminal 12 or equivalent of the building 13 at a second location of the building 13. In one embodiment the second computer system 14 runs on at least one platform. In another embodiment the second computer system 14 runs on a different platform. The first and second computer systems 14 are in communication with each other. A first plurality of sensors is coupled to the first switch terminal 12 or equivalent and the first computer system 14 and a second plurality of sensors is coupled to the second switch terminal 12 or equivalent and the second computer system 14. Each of a sensor 15 is configured to provide signal data to the first or second computer systems 14 respectively. Each of the first and second computer systems 14 produces a command or data output that relates to at least one of: a command output for a local control system 16, a command output for a different system, a data output for a different system, a command output for a non-local device 18 or a data output that is a non-local device. Each of an output includes learned data from that is based on machine intelligence from previous data collected about patterns of a building occupant.

In one embodiment at least one interface 20 is coupled to the second switch terminal 12 or equivalent and the second computer system 14 is configured to receive a command input.

In one embodiment the first switch terminal 12 or equivalent and second switch terminal 12 or equivalent are configured to receive from each other a data output that is used to create a command output that relates to the first switch terminal 12 or equivalent, the second switch terminal 12 or equivalent or a non-local device.

In one embodiment the specific device 18 is the first or second switch terminal 12 or equivalent.

In one embodiment the output command is to at least one of the first and switch terminal 12 or equivalent interfaces 20.

In one embodiment the output command is to a system device 18 other than the first or second switch terminal 12 or equivalent.

In one embodiment, the system 10 is provided for one or more rooms, as well as non-rooms such as hallways and the like, in a building 13 that includes one or more load controlling device 18 each coupled with a computing device 14. In one embodiment computing device 14 is integrated with a load controlling device 18. In one embodiment switch terminal 12 or equivalent are provided. In one embodiment system 10 that allows for a range of functions to be achieved via an interaction with the one or more of the following: controlled loads, first party devices 18 including among others additional switch terminal 12, mobile phones 23 with first party applications running on them, a third party cloud 21, as illustrated in FIG. 1, the first party's back end instead of cloud 21, third party devices 18 or services, mobile devices 23 and the like.

In various embodiments databases 27 relative to a building occupant switch terminal parameter are provided. There can be multiple databases 27 across devices 18 in system 10, associated with one or more terminal switches, in the cloud 21, at a switch terminal backend, and the like. In one embodiment the one or more databases 27 includes a receiving device that includes a database of building occupant switch terminal parameters. The database receives information from the sensors 15 At least a portion of the building occupant switch terminal parameters are processed. In one embodiment the sensors 15 provide information relating to the building occupant switch terminal parameter that is stored in the database 27. In one embodiment the sensors 15 wirelessly communicate via at least one communication route with a server that is in communication with the database 27. In one embodiment a building occupant switch terminal parameter classification system is used. The server uses one or more processors to process the building occupant switch terminal parameter information from the sensors 15.

As non-limiting examples switch terminal parameters include but are not limited to: electrical performance of different electrical loads controlled by the system 10 for optimal dimming performance; the monitoring of the health of the electrical loads; the preferred lighting levels of occupants throughout the day and year; the activity patterns of building occupants; how building occupants prefer their lighting based on different activity patterns; how natural light impacts different rooms within a building; when people go to sleep; how many people regularly occupy a building; the individual preferences that are held by different people who regularly occupy the building; generalized personas that represent people that regularly occupy the building; the distinct voice characteristics of different individuals inside the building; the common patterns of usage of different internal areas of the building 13, persona identification; space mapping; lighting personas that are portable; switch(es) only features or switch(es) plus cloud; calls; intercom; load control calibration; electrical load monitory; hearing impaired features; WiFi repeating; third party activities such as guest mode; reporting on energy savings; eco mode; direct connection to a device 18; advertising based on the data; mobile app interacting; switch setup; mobile devices 23 setup; mobile devices 23 calibration; intelligent grouping; mobile devices 23 ordering of switches by distance in the app; method for opportunistically transferring data and platform via phone including but not limited to a mobile devices 23; snapshot feature; applications on a switch by a first, second, third party and the like; selectably managed; selectably installed or deleted; applications on the switch 12 by back-end 17 and/or cloud 21 a first, and the like; selectably installed or deleted; other devices/services interacting with the switch 12, including but not limited to building 13 wake up; other devices/services and the like; coordination with light sources to deliver a desired light spectrum; and the like.

In one embodiment system 10 uses platforms that are used by system 10 to build adaptive control systems 10 by using building occupant switch terminal parameters As non-limiting examples, platform algorithms include but are not limited to: NIB. Linear Regression, Logistic Regression, Decision Tree. SVM, Naïve, Bayes, KNNK-Means, Random Forest, Dimensionality Reduction. Algorithms Gradient Boost & Ad boost, and Linear Regression System 10 can include switch terminal 12 or equivalent, other first party devices 18 including additional switch terminals 12 or equivalent, mobile devices 23 in communication with system 10, first party or third party applications, Network Systems 25, a router 24, one or more bridge 26. In various embodiments, system 10 provides a load controlling device 18 or system 22 included with a computing device 14 that can be integrated with load controlling device 18 to create a switch terminal device 12 or system 12. The switch terminal 12 or equivalent can include a power source 25, an electrical circuit 28, at least one electrical load in addition to the switch terminal 12 or equivalent. As a non-limiting example bridge 24 can provide any number of different types of communication including but not limited to, Bluetooth, Bluetooth Low Energy BLE and sub-GHz band; local and distributed protocols for establishing a communication system RF, WiFi, and the like as more fully discussed hereafter.

In one embodiment system 10 is coupled to a third party system 10, third party devices 18 or services accessible via the Network Systems 25, one or more mobile devices 23, and the like.

Figure 2:
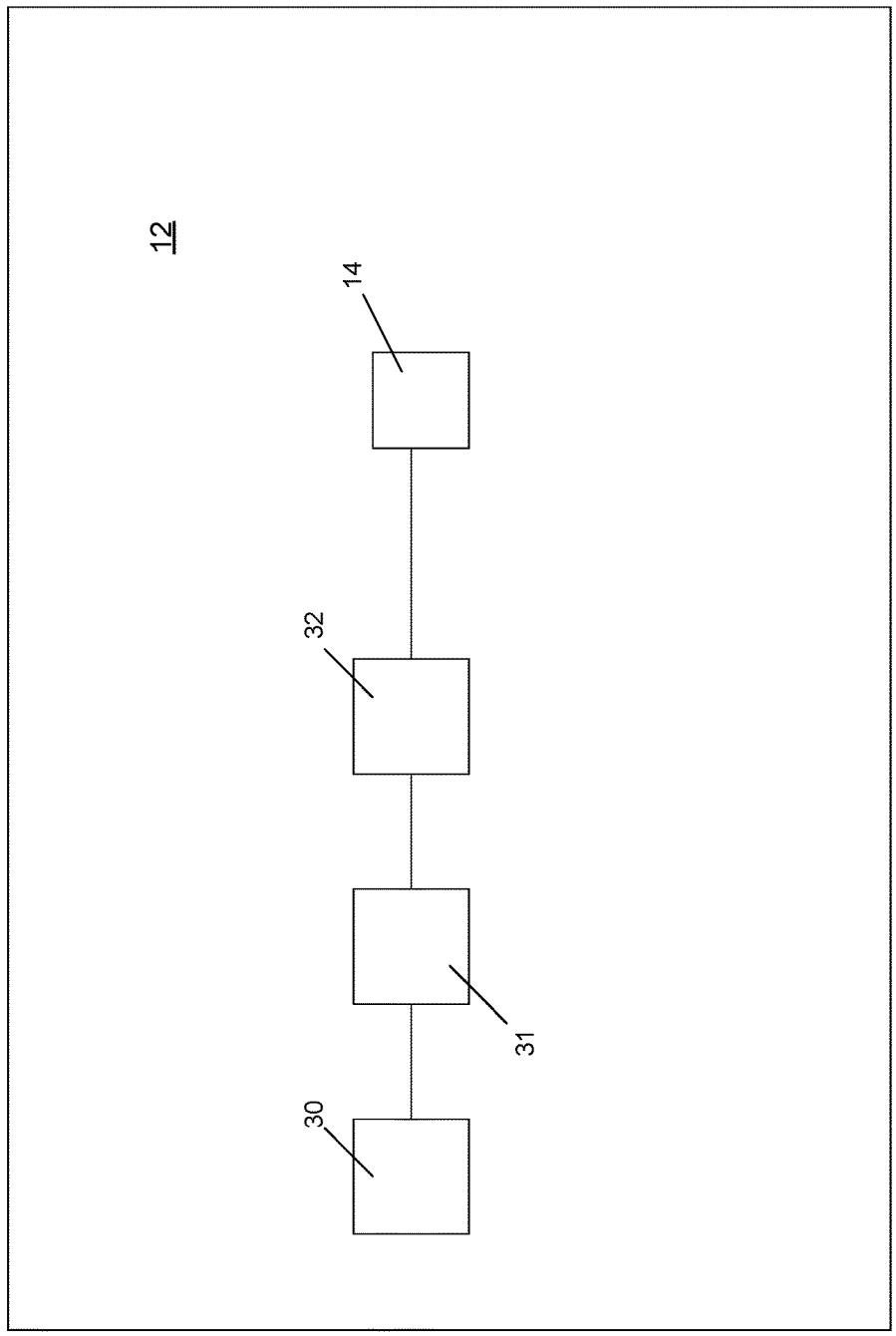
FIG. 2 illustrates one embodiment of a switch terminal that can be used with the present invention.

As illustrated in FIG. 2 in one embodiment the switch terminal 12 or equivalent includes wiring components 30 that are coupled to existing circuitry wiring 31, a power management system 32 and computing device 14. In other embodiment additional devices 18 can be included.

Figure 3:
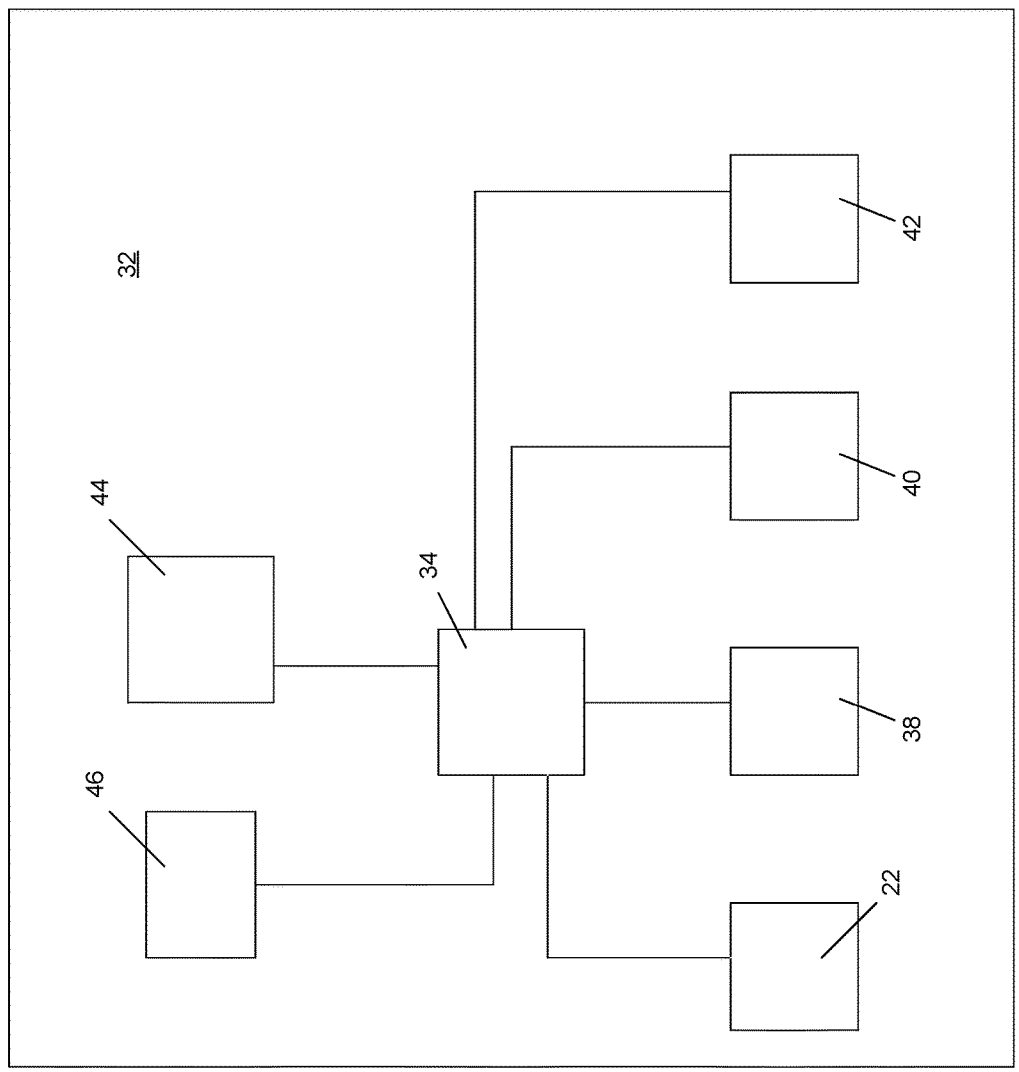
FIG. 3 illustrates one embodiment of a power management system 32 that can be used with the present invention.

As illustrated in FIG. 3 in one embodiment power management system 32 can include a Micro Controller Unit MCU 34, a form of local energy storage 38, a load control system 22, which can be dynamic, one or more locally executable platforms located on the included MCU 34 and an electrical circuit characteristic measurement system 40. In one embodiment the integrated computing device 14 includes the MCU 34, a memory system 42 for persistent storage 44, a set of locally executable platforms located MCU 34 and provided by backend 17, cloud 21 and/or a network connectivity platform 46.

As illustrated in FIG. 4 in one embodiment the integrated computing device 14 includes one or more of: one or more building occupant interface 20 elements including but not limited visual displays 48, touchscreen 50, LEDs 52, speakers 54, tactile buttons 56, voice recognition interfaces 58 and haptic engines 60, one or more sensors 15 and the like. In one embodiment one or more additional processor components 62 are provided including but not limited to CPUs, GPUs, and DSPs; one or more additional platforms provided by backend 17 and/or cloud 21 and loaded locally onto the computing device 14 for local execution to achieve additional functionality including but not limited to, matching learning, lighting related objectives, one or more networking technologies including but not limited to Wifi, Bluetooth, BLE and sub-GHz band; local and distributed protocols for establishing a communication system or method 64 between first and third party devices 18 or services with each other. As a non-limiting example a mesh network 64 can be used.

Figure 5:
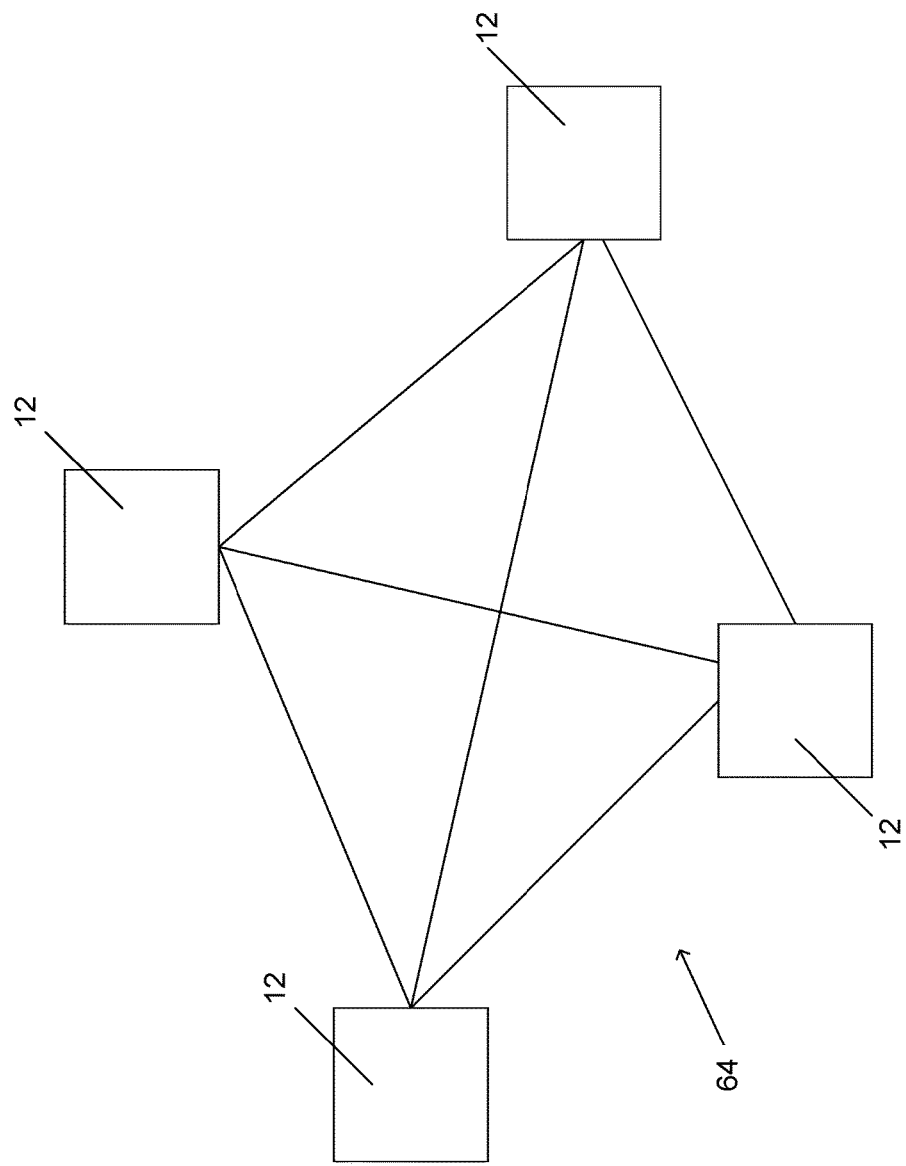
FIG. 5 illustrates one embodiment of a mesh network that can be used with the present invention.

As illustrated in FIG. 5 in one embodiment one or more integrated computing devices 14 optionally communicate with one another when present over one or more mesh networks 64. In one embodiment the mesh network 64 can be created over WiFi, sub-GHz, we well as any type of system or method 64 that allows communication between first and third party devices 18 or services with each other, and the like As A non-limiting example mesh network 64 allows a range of different message types to be transferred between individual computing devices 14 including but not limited to messages that can include data or command inputs for devices 18 other than the device 18 transmitting it.

In one embodiment system 10 uses one or more platforms. In one embodiment a network-transmission-based (NTB) algorithm is utilized.

In one embodiment of the power management system 38, when power is detected on the electrical circuit 28, the included MCU 34, the locals installed on that MCU 34, and the lighting circuit measurement system 50 can combine to identify, if present, the types of electrical lighting loads, other than the switch terminal 12 or equivalent, that are present on that circuit to allow for differential treatment of those loads.

In one embodiment of the power management system 38, when power is detected on the electrical circuit 28, the included MCU 34, the one or more platforms 14 installed on that MCU 34, and the lighting circuit measurement system 50 can combine to identify, if present, the specific models of electrical lighting loads that are present on that circuit by matching their observed characteristics and matching them to previously recorded fingerprints for other units of the same model to allow for differential treatment of those loads.

In one embodiment a load characterization algorithm is utilized in combination with memory by assessing the manner by which an attached load consumes power from a controlled circuit. As a non-limiting example this can be achieved by executing a calibration procedure that uses a sequence of opening and closing the circuit to measure and asses electrical characteristics including but not limited to the circuit's power factor, real and apparent power usage, the amount of current that is necessary to generate resistance in the circuit, the timing of in-rush current phases. Once the nature of the characteristics is determined the system can classify an attached load and appropriately control its power. In one embodiment this may or may not result in the enablement of dimming features for the load. If dimming features are enabled then further characterization of the dimming properties of the circuit is completed to provide an automatic configuration of the circuit for the computing device 18 to use in controlling the load and limiting need to require the building occupant to configure the system directly.

In one embodiment power management system 38 identifies the types of electrical lighting loads present.

In one embodiment of the power management system 38, after identifying the types of electrical lighting loads present. As a non-limiting example MCU 34, the one or more platforms 14 installed on that MCU 34, and the dynamic load control system 16 can combine with instructions received from another source including but not limited to a building occupant of the system, a networked device 18 or a cloud service to optimally limit the power flowing through the electrical circuit 28 to the loads to among other functions allow for the widest range of dimming for those electrical lighting loads, to ensure that the loads are not compromised by inappropriate current on the line, to eliminate flickering for the electrical lighting loads by appropriately cutting the electrical sine-wave, and identify when loads have failed.

In one embodiment of the power management system 38, the included MCU 34, the one or more platforms installed on that MCU 34, and the dynamic load control system 16 can combine with the integrated computing device 14 to monitor the health of the loads attached to the electrical circuit 28. If this monitoring results in a determination either by the power management system 32 or the integrated computing device 14, or a combination of those two elements that one or more of the electrical lighting loads has failed or is likely to fail, than a notification can be sent via the network connectivity platform 46 to a building occupant that can take some action based on this information.

In one embodiment of the power management system 38, the included MCU 34, the one or more platforms installed on that MCU 34, the dynamic load control system 16 and the energy storage 38 can combine to ensure in cases where there is a neutral wire available for connecting in the electrical circuit 28, that (a) the switch terminal 12 or equivalent including both the power management system 32 and the integrated computing device 14 maintains sufficient power to operate when the electrical circuit 28 is closed and the electrical loads are powered, (b) that the switch terminal 12 or equivalent maintains sufficient power to operate when the electrical circuit 28 is open and the electrical loads are unpowered and (c) the switch terminal 12 or equivalent maintains sufficient power to operate when there is now power at all in the electrical circuit 28.

In one embodiment of the power management system 32, the included MCU 34, the one or more platforms installed on that MCU 34, the dynamic load control system 22 and the energy storage 38 can combine to ensure in cases where there is not a neutral wire available for connecting in the electrical circuit 28, that (a) the switch terminal 12 or equivalent including both the power management system 32 and the integrated computing device 14 maintains sufficient power to operate when the electrical circuit 28 is closed and the electrical loads are powered. (b) that the switch terminal 12 or equivalent maintains sufficient power to operate when the electrical circuit 28 is open and the electrical loads are unpowered and (c) the switch terminal 12 or equivalent maintains sufficient power to operate when there is now power at all in the electrical circuit 28.

In one embodiment of the power management system 32, when power fluctuates on the electrical circuit 28, creating what is sometimes called dirty loads, one or more of the included MCU 34, the one or more platforms installed on that MCU 34, the dynamic load control system 16 and the lighting circuit measurement system 66 can combine to smooth out the variability in the electrical frequency coming from the source to deliver a more stable frequency to the electrical loads. In one embodiment this operation can thus eliminate or greatly reduce the visible flickering of electrical lighting loads visible to building occupants/humans.

In one embodiment one or more sensors 15 is utilized to determine whether there is occupancy or activity in the room, or any other area of building 15, based on the sensors 15 specific methodology. When a reading is registered on the sensor 15, that singular input is combined with the one or more platforms installed on the device 18 to make a determination of whether the perceived signal qualifies as a presence event. This event and its characterization can then be immediately used by other platforms installed on the integrated computing device 14 for various purposes related to the inventions operation.

In one embodiment the integrated computing device 14 can additionally include two or more one sensor 15. These are utilized to determine whether there is occupancy or activity in the room based on the multitude sensors specific methodologies. In one embodiment when a reading is registered one at least one of the sensors 15, the readings for all included sensors 15 can be individually evaluated and then merged to create a unified data signal representing all of the sensors 15 in use. This multi-modal input is combined with the one or more platforms installed on the device 18 to make a determination of whether the perceived signal qualifies as a presence event. This event and its characterization can then be immediately used by other platforms installed on the integrated computing device 14 for various purposes related to the inventions operation.

In one embodiment the integrated computing device 14 can additionally include and at least one sensor 15. These are utilized to determine whether there is occupancy or activity in the room based on the sensors 15 specific methodology. When a reading is registered on the sensor 15, that singular input is combined with the one or more platforms installed on the device 18 to make a determination of whether the perceived signal qualifies as a presence event.

As a non-limiting example, this event, it's characterization and the raw data recorded from the sensor or sensors 15 relating to that event can then be saved to the storage system 54 so that it can be utilized later by the locally installed platforms, or transferred via Network Systems 15 to other similar first party devices 18, to mobile devices 23, to cloud 21, to third party devices 18 or services accessible via Network and the like.

In one embodiment the integrated computing device 18 can additionally include two or more sensors 15, which can be internal or external to computing device 14. These are utilized to determine whether there is occupancy or activity in the room based on the multitude sensors 15 specific methodologies as more fully explained hereafter.

When a reading is registered with at least one of the sensors 15, the readings for all included sensors 15 can be evaluated and then merged to create a unified data signal representing all of the sensors 15 in use. This multi-modal input is combined with the one or more platforms installed on the device 18 to make a determination of whether the perceived signal qualifies as a presence event.

This event, it's characterization and the raw data recorded from the sensors 15 relating to that event can then be saved to the storage system 54 so that it can be utilized later the locally installed platforms, or transferred via a network connectivity method 58 to other similar first party devices 18, to mobile devices 23, to cloud system 21, to first party's back-end, to third party devices 18 or services accessible via Network Systems 25.

In one embodiment the integrated computing device 14 can additionally include and at least one sensor 15. These are utilized to determine whether there is an absence of occupancy or activity in the room based on the sensors 15 specific methodology. When a reading is registered on the sensor 15, that singular input is combined with the one or more platforms installed on the device 18 to make a determination of whether the perceived signal qualifies as an absence of presence event. This event and its characterization can then be immediately used by other platforms installed on the integrated computing device 14 for various purposes related to the system 10 operation.

In one embodiment the integrated computing device 14 can additionally include two or more sensors 15. These are utilized to determine whether there is an absence of occupancy or activity in the room based on the multitude sensors 15 specific methodologies. When a reading is registered one at least one of the sensors 15, the readings for all or a portion of the sensors 15, which may be at switch terminal 12 or equivalent or external to switch terminal, are individually evaluated and then merged to create a unified data signal representing all the readings from the all or portion of the sensors 15 that have been used.

This multi-modal input is combined with the one or more platforms installed on the device 18 to make a determination of whether the perceived signal qualifies as an absence of presence event, this event and its characterization can then be immediately used by other platforms installed on the integrated computing device 14 for various purposes related to switch terminal 12 operation, building occupant switch terminal parameters In one embodiment the integrated computing device 14 can additionally include and at least one sensor 15. These are utilized to determine whether there is an absence of occupancy or activity in the room based on the sensors 15 specific methodology.

As a non-limiting example when a reading is registered on the sensor 15, that singular input is combined with the one or more platforms installed on the device 18 to make a determination of whether the perceived signal qualifies as an absence of presence event. This event, it's characterization and the raw data recorded from the sensor or sensors 15 relating to that event can then saved to the storage system 54 so that it can be utilized later the locally installed platforms, or transferred via a network connectivity method 58 to other similar first party devices 14, to mobile devices 23, to first party back-end, cloud 21, third party devices 18 via the Network Systems 25.

In one embodiment the integrated computing device 14 can additionally include two or more sensors 15. As a non-limiting example these can be used to determine whether there is an absence of occupancy or activity of a building occupant in the room or any portion of building 15 based on the multitude sensors 15 specific methodologies. When a reading is registered one at least one of the sensors 15, the readings for all included sensors 15 is individually evaluated and then merged to create a unified data signal representing all of the sensors 15 in use. This multi-modal input is combined with the one or more platforms installed on the device 18 to make a determination of whether the perceived signal qualifies as an absence of presence event.

This event, it's characterization and the raw data recorded from the sensors 15 relating to that event can then be saved to the storage system 44 so that it can be utilized later the locally installed platforms, or transferred via a network connectivity method to cloud system 21, backend 17 to mobile devices 23, to first party controlled cloud service 20, to third party controlled cloud services 22, accessible via the Network Systems 25.

In one embodiment the integrated computing device 14, in combination either the one or more platforms installed on the device 18 or any platforms or platforms available on one or a combination of other similar first party devices 18, mobile devices 23, first party controlled cloud services 17, devices 18 and the like accessible via the Network Systems 25 that communicate with a single integrated computing device 14 via a network connectivity method, can dynamically adjust the available characteristics for a sensor 15 or group of sensors 15 to modify the combinations determination of whether presence and activity events or the absence of presence and activity are observed.

In one embodiment, the switch terminal 12 or equivalent can use one or more sensors 15 to scan a three dimensional space of building 15. The switch terminal 12 or equivalent can combine signals from the sensor or sensors 15 with local installed platforms to make determinations as to the existence or absence of presence or activity in that space, determine the nature or characteristics of the presence or activity in that space by a building occupant and independently decide how to alter its function based on that determination.

In one embodiment, the switch terminal 12 or equivalent can utilize its ability to scan a three dimensional space and determine the existence or absence of presence of activity in that space to independently decide how to control an electrical lighting circuit 14. The dimensions of how the switch terminal 12 or equivalent controls the circuit 16, including but not limited to a light circuit 16, can thus be a result of its interpretation of a multitude of signals and other contextual factors to create an control system living experience, which can be as a non-limiting example an adaptive control system experience, that provides for the, local determination of lighting states based on what is specifically happening in a three dimensional space observed by a particular switch terminal 12 or equivalent.

In one embodiment, the switch terminal 12 or equivalent may have more than one local installed platforms executing simultaneously on its integrated computing device 14 that each are independently assessing a single signal from a sensor 15 or a multitude of signals from more than one sensor 15 to the end of each making their own independent decision about how the lighting environment as controlled by the electrical circuit 28 to which that switch terminal 12 or equivalent is attached should adapt to meet a predetermined state based on their independent assessments as to the existence or absence of presence or activity, including but not limited to that of a building occupant, in a space of building 15, or the nature of the existence or absence of presence or activity in that space.

When more than one platforms attempt to change the state of the switch terminal 12 or equivalent control of the electrical lighting circuit 14, another third local installed platform will be executed to determine which of the platforms may control the state of the switch terminal 12 or equivalent circuit control. This central lighting decision engine 66 can assess a range of attributes included in a platforms attempt to change the state of the power management system 38, the means by which a switch terminal 12 or equivalent controls the electrical lighting circuit 14 to which it is attached, and determine how the attempts should be applied to the power management system 38.

In one embodiment, the switch terminal 12 or equivalent, while observing a three dimensional space of building 15, may have one or more local installed platforms determine that their local interpretation of the signals collected via one or more sensors 15 suggest the existence of presence or activity in that space that when combined with the logic in their respective platforms result in one or more of the platforms initiating a command to change the state of the power management system 38 to allow for at least some electricity to reach to loads attached to the electrical lighting circuit 28. In some instances the command issued by one or more of these platforms may be to allow more electricity into the circuit or to allow less electricity. In all instances, these commands are assessed by the central light decision engine 66 and executed or not based on the determination of that one or more platforms.

Figure 6:
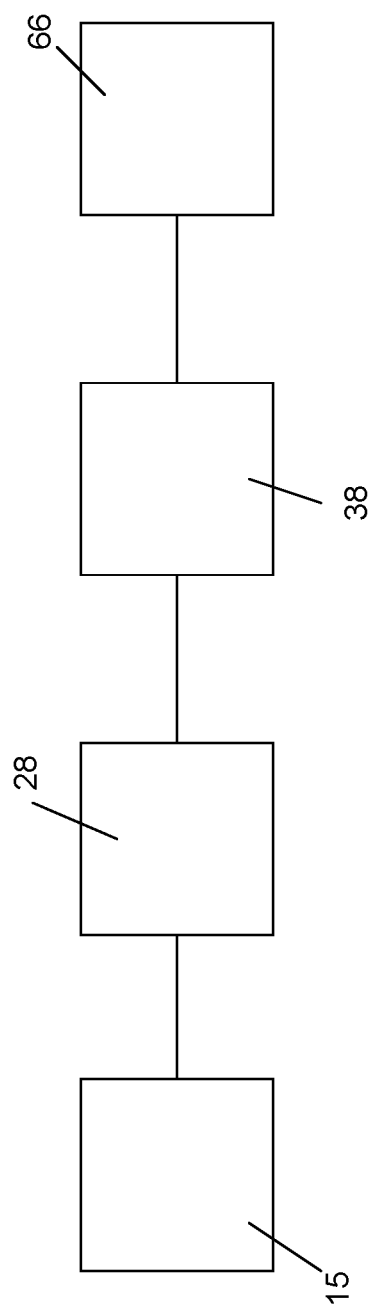
FIG. 6 illustrates one embodiment of a central light decision engine that can be used with the present invention.

In one embodiment, the switch terminal 12 or equivalent, while observing a three dimensional space, may have one or more local installed platforms determine that their local interpretation of the signals collected via one or more sensors 15 suggest the absence of presence or activity in that space that when combined with the logic in their respective platforms result in one or more of the platforms initiating a command to change the state of the power management system 38 to allow for no electricity to reach to loads attached to the electrical circuit 28. In some instances the command issued by one or more of these platforms may be first allow more or less electricity into the circuit but it ultimately request that not electricity be allowed to power loads. In all instances, these commands are assessed by the central light decision engine 66 and executed or not based on the determination of that one or more platforms, as illustrated in FIG. 6.

In one embodiment, when it includes an ambient light sensing device 18 as one of its sensors 15, the switch terminal 12 or equivalent can assess the illuminance of the three dimensional space or building 13 it observes. In certain cases, the local installed platforms, can interpret the signal from this ambient light sensing device 18 and use that measurement to alter the switch terminal 12 or equivalent operation. Local installed platforms can use the ambient light measurement to trigger certain actions within their own platform or initiate other local installed platforms. These one or more platforms 14 can also issue commands to change the power management system's 38 state that instructs that system 10 to change its control of the electrical lighting circuit 14 until a specific value is attained from the attached ambient light sensing device.

In one embodiment, when it includes an ambient light sensing device 18 as one of its sensors 15, the switch terminal 12 or equivalent can employ any system 10 local platforms for determining whether there is an existence or absence of presence or activity of a building occupant and the nature of that circumstances combined with an ambient light sensor to maintain a state of constant lighting level in a space (constant illuminance), or at least attempt to reach a state closest to the desired levels by assessing changes in ambient light conditions via a sensor 15, interpreting those changes via one or more platforms and then adjusting the state of the power management system 38 to vary the amount of power reaching the electrical lighting loads. The platform maintaining the constant illuminance provided by the switch terminal 12 or equivalent may attempt to maintain the exact amount of light originally created, or it might navigate to other lighting levels based on certain instructions from other platforms executing on the device 18.

In one embodiment, when it includes an ambient light sensing device 18 as one of its sensors 15, the switch terminal 12 or equivalent can receive inputs from a building occupant via an interface 20, an application on a mobile devices 23 or a platform initiated on a first or third party cloud service to request a certain level of illuminance from the electrical circuit 28 and electrical lighting loads connected to that switch terminal 12 or equivalent. Once this manual request is received by a switch terminal 12 or equivalent, it can maintain a level of constant illuminance, or at least attempt to reach a state closets to the desired levels by assessing changes in ambient light conditions via a sensor 15, interpreting those changes via one or more platforms and then adjusting the state of the power management system 38 to vary the amount of power reaching the electrical lighting loads. The platform maintaining the constant illuminance provided by the switch terminal 12 or equivalent when the light level is manually requested by a building occupant will control the state of the power management system 38 in its attempt to reflect the requested value until a local installed platform decides for it to no longer be controlling.

In one embodiment, the local installed platforms can combine with the power management system 38 to shift the level of power reaching the electrical lighting loads. When these shifts occur, the local installed platforms can execute a fully platform able (not fixed) transition between one lighting levels to another. These transitions allow for an appreciably smooth transition of the lights that is non-liner like existing systems. In addition, the fully platform able nature of these transitions allow for the local installed platforms, if desired, to use the transition to communicate certain messages to the occupants of a room.

In one embodiment, one or more of the local installed platforms can serve to regulate the power management system 38 according to the platforms' internally defined logic and thus control the state of the electrical lighting circuit 14 in order to effectuate a modulation of the light exposure generated by the electrical lighting loads attached to that circuit in order to create health related impacts on the occupants of a space within which those loads exist. These health related impacts could result from the specific exposure to light or lack of exposure to light or exposure to different levels of light at different times of the day, or in patterns that affect a human subjects biological systems.

Figure 7:
FIG. 7 illustrates one embodiment of an adaptive network that includes two or more switch terminals.

As illustrated in FIG. 7, in one embodiment, the present invention includes a switch terminal 12 or equivalent that minimally includes two or more switch terminal 12 or equivalent to operate on a commonly accessible network 74 and thus can coordinate their individual and concerted operation based on information shared between the devices. This interaction also allows for the switch terminal 12 or equivalent to execute additional capabilities as an integrated system that an individual switch terminal 12 or equivalent could not do in isolation.

In one embodiment, two or more switch terminal 12 or equivalent can match independently and use networking technology 68 shared in common by each device 18 to create an ad-hoc mesh network 64 between themselves, thus forming the required commonly accessible network 74 to allow the independent devices to begin constituting the switch terminal 12 or equivalent. In this embodiment, no externally provided network (third party) like a wireless LAN, hardwire or bridge 18 is necessary for the system 10 to compose itself.

In one embodiment, the two or more switch terminals 12 or equivalent can use backend 17, cloud system 21 and the like to seek and identify the existence of other switch terminal 12 or equivalent on the network and begin constituting the switch terminal 12 or equivalent.

In one embodiment two or more switch terminals 12 or equivalents use a previously existing and independent third party accessible network 10 to seek and identify the existence of other switch terminals 12 or equivalent at first party system 10, or at third party system 10. This can then begin constituting the switch terminal 12 or equivalent as well as interact with other nodes that might exist on that same system 10. If this system 10 has other third party devices 18 associated with it then both the switch terminal 12 or equivalent and an individual switch terminal 12 or equivalent can interact with those available devices 18. In one embodiment if this network has access to Network Systems 25. This interaction can then be coupled with first party back-end, cloud 21, third party devices 18 or services, and the like.

In one embodiment, the switch terminal 12 or equivalent can allow other switch devices of system 10, or a third party system to begin sending and receiving data between devices to allow for the operation of those individual switch terminal 12 or equivalent to be based on data that they wouldn't have been able to attain independently via their local installed platforms, sensors 15, interfaces 20 and the like.

In one embodiment, the switch terminal 12 or equivalent can use the individual switch terminal 12 or equivalents' ability to combine signals from the sensor or sensors 15 with local installed platforms and make determinations as to the existence or absence of presence or activity in that space, and determine the nature or characteristics of the presence or activity in that space to inform the members of the switch terminal 12 or equivalent to the existence or absence of presence or activity in the disparately observed spaces and the nature or characteristics of the presence of activity as to allow the members of the system to alter their operation based on information collected from spaces they cannot similarly observe based on their physical location.

In one embodiment, a switch terminal 12 or equivalent ("first device") that is a member of a switch terminal 12 or equivalent can utilize another member's ("second device") ability to scan an three dimensional space that is not similarly perceived from the first device 18 and determine the existence or absence of presence of activity in that space to allow the first device 18 to decide how to control an electrical lighting circuit 14 to which it is attached. The dimensions of how the first device 18 controls the electrical lighting circuit 28 can thus be a result of its interpretation of a multitude of signals and other contextual factors received from a second device 18 to create an adaptive control system experience, that as a non-limiting example, provides for the, local determination of lighting states. The adaptive control system is based on what is specifically happening in one or more three dimensional spaces of building 15 not similarly observed by a particular switch terminal 12 or equivalent.

In one embodiment, a switch terminal 12 or equivalent ("first device") that is a member of a switch terminal 12 or equivalent may have more than one local installed platforms executing simultaneously on its integrated computing device 14 that each are independently assessing a single signal from a sensor 15 or a multitude of signals from more than one sensor 15 attached to a other members of the switch terminal 12 or equivalent ("other devices") so as to allow the one or more platforms on the first device 18 to make their own independent decision about how the lighting environment as controlled by the electrical lighting circuit 14 to which that first switch terminal 12 or equivalent is attached should adapt to meet a predetermined state based on the one or more platforms' independent assessments as to the existence or absence of presence or activity in a space or the nature of the existence or absence of presence or activity in a space not perceived in the same way by the first device.

In one embodiment, a switch terminal 12 or equivalent ("first device") observes a three dimensional space of building 15 and receives information from other devices 18 or platforms elements of the system 10, as well as third party systems, switch terminal 12 or equivalent ("other devices"), may receive data from other devices that allow one or more local installed platforms on the first device 18 to determine based on its local interpretation of the signals collected via one or more sensors 15 of other devices, or a direct indication from a local installed platforms on those other devices that based on their local interpretation of their collected signals that there is the existence of presence or activity in their observed space—a space not similarly observed by the first device. The reaching of this independent determination or the reception of a similar message from another device 18 can allow the first device 18v to inform it's local installed platforms to evaluate whether the first device 18 may also initiate a command to change the state of the power management system 38 to allow for at least some electricity to reach to loads attached to the electrical lighting circuit 28.

In one embodiment the command issued by one or more of these platforms may be to allow more electricity into the circuit or to allow less electricity. In all instances, these commands are assessed by a central lighting decision engine and executed or not based on the determination of that one or more platforms.

In one embodiment, a switch terminal 12 or equivalent ("first device") that is a member of a switch terminal 12 or equivalent, while observing a three dimensional space and receiving information from other members of the switch terminal 12 or equivalent ("other devices"), to determine based on its local interpretation of the signals collected via one or more sensors 15 of other devices, or a direct indication from a local installed platforms on those other devices that based on their local interpretation of their collected signals that there is the absence of presence or activity in the observed space—a space not similarly observed by the first device. The reaching of this independent determination or the reception of a similar message from another device 18 can allow the first device 18 to inform it's local installed platforms to evaluate whether the first device 18 may initiate a command to change the state of the power management system 38 to allow for no electricity to reach to loads attached to the electrical lighting circuit 14.

In one embodiment the command issued by one or more of these platforms may first allow more or less electricity into the circuit but it ultimately request that no electricity be allowed to power loads at all. In all instances, these commands are assessed by the central light decision engine 66 and executed or not based on the determination of that one or more platforms.

In one embodiment, when at least one of the switch terminal 12 or equivalent that is a member of a switch terminal 12 or equivalent includes an ambient light sensing device 18 as one of its sensors 15, the system can assess the illuminance in three dimensional spaces where at times not all of the switch terminal 12 or equivalent can perceive the illuminance of all the observed spaces in a building. In certain cases, the local installed platforms on one device 18 ("first device"), can interpret the illuminance signal from an ambient light sensing device 18 attached to a second device 18 and use that measurement to alter the first devices' operation. Local installed platforms on any switch terminal 12 or equivalent connected to a switch terminal 12 or equivalent can use the ambient light measurement capability of any other member of the system to trigger certain actions within its own platform or initiate other local installed platforms on other devices.

These one or more platforms can also issue commands to change the power management system's 38 state for the first device, or possibly to other devices in the system by instructing that the system to change its control of the electrical lighting circuit 14 until a specific value is attained from a single or plurality of ambient light sensing devices attached to the system 10.

In one embodiment, when at least one of the switch terminal 12 or equivalent that is a member of a switch terminal 12 or equivalent includes an ambient light sensing device 18 as one of its sensors 15, the system can to assess the illuminance in three dimensional spaces where at times not all of the switch terminal 12 or equivalent can perceive the illuminance of all the observed spaces. In some cases, the switch terminal 12 system or equivalent can combine is ability to make determinations as to the existence or absence of presence in activity and the nature of those circumstances across one or more spaces observed by at least one of its members and the capability of one or more of those devices via at least one ambient light sensor to assess the illuminance of one or more of the observed spaces to maintain a state of constant lighting level in one or more spaces (constant luminance), or at least attempt to reach a state closest to the desired levels of illuminance by assessing changes in ambient light conditions via a sensor 15, interpreting those changes via one or more platforms on at least one of the member devices and then adjusting the state of the power management system 38 on one or more of the member devices to vary the amount of power reaching the electrical loads.

The platform or platforms maintaining the constant illuminance provided by the switch terminal 12 or equivalent may attempt to maintain the exact amount of light originally desired, or it might navigate to other lighting levels based on certain instructions from other platforms executing on devices within the system.

In one embodiment, when at least one of the switch terminal 12 or equivalent that is a member of a switch terminal 12 or equivalent includes an ambient light sensing device 18 as one of its sensors 15, the system can to assess the illuminance in three dimensional spaces where at times not all of the switch terminal 12 or equivalent can perceive the illuminance of all the observed spaces. In some cases, the switch terminal 12 or equivalent can receive inputs from a building occupant via an interface 20 coupled to a switch terminal 12 or equivalent that is a member of the system, an application on a mobile device 23 or a platform initiated on a first or third party cloud service to request a certain level of illuminance from one or more of the electrical circuit 28 and electrical lighting loads connected to switch terminal 12 or equivalent that are a member of the system 10.

Once this manual request is received by a switch terminal 12 or equivalent that is a member of system 10 it can distribute that command to any one or multitude of other devices on the system, and if requested, maintain a level of constant illuminance in the spaces observed by one or more of the member devices, or at least attempt to reach a state closest to the desired levels by assessing changes in ambient light conditions via a one or more ambient light sensors 15 included in member devices, by interpreting changes in ambient light collected via one or more member devices, including the possibility of collecting readings from its own sensors 15, via one or more platforms and then adjusting or requesting the adjustment of the state of the power management system 38 on any number of the member devices in order to vary the amount of power reaching the electrical lighting loads.

The platform or platforms maintaining the constant illuminance provided by the switch terminal 12 or equivalent when the light level is manually requested by a building occupant will control the state of the power management system 38 of member devices in its attempt to reflect the requested illuminance level until a local installed platform on any one of the member devices decides for it to no longer be controlling.

In one embodiment, when two or more switch terminal 12 or equivalent are members of a single switch terminal 12 or equivalent, the local installed platforms on each discrete member device 18 can interact with local installed platforms of other member devices to orchestrate system wide changes in lighting levels by coordinating individual shifts in the level of power reaching the electrical loads attached to member devices. When these shifts occur, the local installed platforms can execute a fully platform able (not fixed) transition between one lighting level to another by both a single switch terminal 12 or equivalent in the system or by two or more, and possible the entire group of member devices. In addition, the fully platform able nature of these transitions allow for the local installed platforms, if desired, to use the transition to communicate certain messages to the occupants of a room or any other space in building 15.

In one embodiment, when two or more switch terminal 12 or equivalent are members of a single switch terminal 12 or equivalent, one or more of the local installed platforms on each discrete member device 18 can interact with local installed platforms of other member devices their power management systems 38 according to the platforms' internally defined logic and thus control the state of the electrical lighting circuits 14 attached to the lighting system to effectuate a modulation of the light exposure generated by the electrical lighting loads attached to those circuits in order to create health related impacts on the occupants of a space or spaces where those loads exist. These health related impacts could result from the specific exposure to light or lack of exposure to light or exposure to different levels of light at different times of the day, or in patterns that affect a human subject's biological systems.

In one embodiment system switch 12 can be used for local machine learning on switch 12 and one or more devices 18 can be combined for this purpose.

In one embodiment, when a single switch terminal 12 or equivalent is the sole member of a switch terminal 12 or equivalent, one or more of the local installed platforms on that device 18 can collect and optionally summarize data received from sensors 15 integrated into that device, the data generated by a building occupant's interaction with the switch terminal 12 or equivalent via interfaces 20, mobile devices 23, and data created by local installed platforms to create a corpus of data upon which those local installed platforms can analyze and derive insights through the use of platform algorithms that improve the local installed platforms accuracy in determining the presence of activity in an observed space, the absence of activity in an observed space, the characteristics of the activity and the most appropriate adaptive control system behavior as learned from the collected data. As a non-limiting example of a type of control system behavior, the system 10 can identify based on the learned data the desired level of illuminance in a space based on the observed level of activity, the appropriate amount of electricity required by the electrical lighting circuit 14 to produce the desired amount of illuminance in the observed space as prescribed by one or more of the local installed platform 39, thus resulting in the continual enhancement of the switch terminal 12 or equivalent performance in delivering the adaptive control system in a space observed by the switch terminal 12 or equivalent.

In one embodiment, when one or more switch terminal 12 or equivalent are members of a single switch terminal 12 or equivalent that is not connected to a Network Systems 25 connection, one or more of the local installed platforms on one or more of the discrete member devices 18 can collect and optionally summarize data received from sensors 15 integrated on one or any number of the member devices 18, data generated by a building occupants interaction with the switch terminal 12 or equivalent via interfaces 20 on one or any number of the first party devices 18, other similar first party devices 18, mobile devices 23. Network Systems 25 devices 18, third party devices 18 or services accessible directly via Network Systems 25, and data created by local installed platforms on one or more of the member devices in the switch terminal 12 or equivalent to create a corpus of data upon which the local installed platforms on any one of the member devices can analyze and derive insights through the use of platforms algorithms that improve the local installed platforms accuracy in determining the presence of activity in an observed space, the absence of activity in an observed space, the characteristics of the activity and the most appropriate adaptive control system behavior as learned from the collected data. As a non-limiting example of a type of control system behavior, the system 10 can identify based on the learned data the desired level of illuminance in an observed space based on the observed level of activity, the appropriate amount of electricity required by the electrical lighting circuit 14 to produce the desired amount of illuminance in any particular space as prescribed by one or more of the local installed platform 39, thus resulting in the continual enhancement of switch terminal 12 or equivalent performance in delivering the adaptive control system in a space observed by any member of the switch terminal 12 or equivalent.

In one embodiment, when one or more switch terminal 12 or equivalent are members of a single switch terminal 12 or equivalent and that system is connected to the Network Systems 25, one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the first party devices 18, mobile devices 23, Network Systems devices 18, third party devices 18 or services directly via a Network Systems 25 and data created by local installed platforms on one or more of the first or third party devices 18 to create a corpus of data upon which those installed platforms can analyze and derive insights through the use of platforms algorithms that improve the local installed platforms accuracy in determining the presence of a building occupant, a building occupant's activity in an observed space, the absence of a building occupant or an activity in an observed space the characteristics of the activity and the most appropriate adaptive control system behavior as learned from the collected data. As a non-limiting example of a type of control system behavior, the system 10 can identify based on the learned data the desired level of illuminance in a space based on the observed level of activity, the appropriate amount of electricity required by a electrical lighting circuit 28 to produce the desired amount of illuminance in a space as prescribed by one or more of the local installed platforms.

In one embodiment this can result in the continual enhancement of switch terminal 12 or equivalent performances in delivering the adaptive control system in a space observed by any member of the switch terminal 12 or equivalent.

In one embodiment, when a single switch terminal 12 or equivalent includes an ambient light sensor 15, the local installed platforms on the specific switch terminal 12 to which the ambient light sensor 15 is integrated, or if that switch terminal 12 or equivalent is a member of a switch terminal 12 or equivalent than the local installed platforms on any of the devices 15 in that system 10 can collect and optionally summarize illuminance data from the ambient light sensor 15 on the original device 18, data created by locally installed platforms on any device 18in the system 10 that relate to the state of the power provided to the electrical lighting circuits 38 controlled by those devices 18, the load characteristics of lighting loads attached to any circuit attached to a member of the system 10 to be analyzed by a platform intended to generate a mathematical relationship between the light levels perceived by the ambient light sensor on the original device 18 and the actual levels of light present in the space observed by the original device 18.

Additionally, this same data and computational results can be used to inform local installed platforms on any member of the switch system of the actual lighting characteristics, including how much power relates to the creation of how much light projected into the space is represented by any electrical lighting circuit 38 connected to a switch terminal 12 or equivalent that is a member of the switch terminal 12 or equivalent.

In one embodiment, when a single switch terminal 12 or equivalent is the sole member of a switch terminal 12 or equivalent, one or more of the local installed platforms on that device 18 can collect and optionally summarize data received from sensors 15 integrated into that device 18, data generated by a building occupant's interaction with the switch terminal 12 or equivalent via interfaces 20, mobile devices 23, and data created by local installed platforms to create a corpus of data upon which those local installed platforms can analyze and derive insights through the use of platforms algorithms that improve the local installed platforms accuracy in determining the relationship between an occupant's or occupants' activity in a specific space and their desired level of illumination in that space for a particular activity. The local installed platforms responsible for computing this relationship will take into consideration the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for illuminance relative to the occupant's or occupants' activity, thus resulting in the continual enhancement of the switch terminal 12 or equivalent performance in delivering the adaptive control system experience in a space observed by the switch terminal 12 or equivalent.

In one embodiment, when one or more switch terminal 12 or equivalent are members of a single switch terminal 12 or equivalent, that is not connected to a Network Systems 25 connection One or more of the local installed platforms on one or more of the discrete member devices can collect and optionally summarize data received from sensors 15 integrated on one or any number of the member devices 18. Additionally data generated can be provided by a building occupant's interaction with the switch terminal 12 or equivalent which can be via interfaces 20 on one or any number of the member devices 18, other similar first party devices 18, mobile devices 23, and Network Systems devices 18, third party devices 18 or services and services. Additionally data created by local installed platforms on one or more of the member devices in the switch terminal 12 or equivalent create a corpus of data upon which the local installed platforms on any one of the member devices that can analyze and derive insights through the use of platforms algorithms that improve the local installed platforms accuracy in determining the relationship between an occupant's or occupants' activity in a specific space and their desired level of illumination in that space for a particular activity.

In one embodiment the local installed platforms responsible for computing this relationship can take into consideration the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for illuminance relative to the occupant's or occupants' activity. This can result in the continual enhancement of switch terminal 12 or equivalent performances in delivering the adaptive control system experience in a space observed by any member of the switch terminal 12 or equivalent.

In one embodiment, when one or more switch terminal 12 or equivalent are members of a single switch terminal 12 or equivalent and system 10 is connected to Network Systems 25 one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the member devices, other similar first party devices 14, mobile devices 23. Network Systems 25 devices 18, third party devices 18 or services accessible directly via a Network Systems 25, third party control cloud service 17, third party devices 18 and services accessible via Network Systems 25 connection and data created by local installed platforms on one or more of the network 10 or third party devices 18 to create a corpus of data upon which those local installed platforms can analyze and derive insights through the use of platforms algorithms that improve the local installed platforms accuracy in determining the relationship between an occupant's or occupants' activity in a specific space and their desired level of illumination in that space for a particular activity.

In one embodiment local installed platforms responsible for computing this relationship can take into consideration the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for illuminance relative to the occupant's or occupants' activity, thus resulting in the continual enhancement of switch terminal 12 or equivalent performance in delivering the adaptive control system in a space observed by any member of the switch terminal 12 or equivalent.

In one embodiment, when one or more switch terminal 12 or equivalent are members of a single switch terminal 12 or equivalent that is not connected to an Network Systems 25 connection, one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the member devices, other similar first party devices 14, mobile devices 23, third party devices 18, and data created by local installed platforms on one or more of the devices 18 in the switch terminal 12 or equivalent to create a corpus of data upon which the local installed platforms on any one of the member devices can analyze and derive insights through the use of platforms algorithms that improve the local installed platforms accuracy in determining the relationship between an occupant's or occupants' movement from one space to another within large space that is made up of two or more smaller but related spaces.

By analyzing aspects of this data set, including, but not limited to, time of day, time intervals between sensor data, activity levels, presence or absence of presence, the local installed platforms can construct activity or pattern maps that represent the distinctive manner by which occupants observed in these spaces move between them. This information can then be used by local installed platforms 34 distributed throughout the switch terminal 12 or equivalent to predicatively change the state of adaptive control systems, including but not limited to the electrical lighting circuits 14 controlled by their respective switch terminal 12 or equivalent to allow for light to be adjusted in an particular space in advance of the occupant's or occupants' presence in that space or just before that light is needed by an occupant or occupants. The local installed platforms responsible for computing these relationship and maps will take into consideration the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for machine learning illuminance relative to the occupant's or occupants' activity. This can result in the continual enhancement of switch terminal 12 or equivalent performances in delivering the adaptive control system experience in a space observed by any member of the switch terminal 12 or equivalent.

In one embodiment, when one or more switch terminal 12 or equivalent are members of a single switch terminal 12 or equivalent and that system is connected to the Network Systems 25, one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the member devices, other similar first party devices 14, mobile devices 23, Network Systems devices 18, third party devices 18 and services accessible directly via Network Systems 25, third party control cloud services 22, third party devices 18 and services accessible via the network and Network Systems 25 connection and data created by local installed platforms on one or more of the member devices to create a corpus of data upon which those local installed platforms can analyze and derive insights through the use of platforms algorithms that improve the local installed platforms accuracy in determining the relationship between an occupant's or occupants' movement from one space to another within large space that is made up of two or more smaller but related spaces. By analyzing aspects of this data set, including, but not limited to, time of day, time intervals between sensor data, activity levels, presence or absence of presence, the local installed platforms can construct activity or pattern maps that represent the distinctive manner by which occupants observed in these spaces move between them.

This information can then be used by local installed platforms 34 distributed throughout the switch terminal 12 or equivalent to predicatively change the state of adaptive control systems, including but not limited to the electrical lighting circuits 14 controlled by their respective switch terminal 12 or equivalent to allow for light to be adjusted in an particular space in advance of the occupant's or occupants' presence in that space or just before that light is needed by an occupant or occupants. The local installed platforms responsible for computing these relationship and maps will take into consideration the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for machine learning illuminance relative to the occupant's or occupants' activity, thus resulting in the continual enhancement of switch terminal 12 or equivalent performance in delivering the adaptive control system in a space observed by any member of the switch terminal 12 or equivalent.

In one embodiment, when a single switch terminal 12 or equivalent is the sole member of a switch terminal 12 or equivalent, one or more of the local installed platforms on that device 18 can collect and optionally summarize data received from sensors 15 integrated into that device, data generated by a building occupant's interaction with the switch terminal 12 or equivalent via interfaces 20, mobile devices 23, and data created by local installed platforms to create a corpus of data upon which those local installed platforms can analyze and derive insights through the use of platforms algorithms that improve the local installed platforms accuracy in determining the identity of an occupant or occupants observed in a space.

As the accuracy of the one or more platforms ability to identify distinct people regularly perceived in a given observed space increase, these local installed platforms can then construct personas containing profile information about such occupants that include, among other information, the occupants desired lighting preferences for a particular space given a particular activity and time of day, and the regular movement patterns within a series of connected spaces for that occupant. Subsequently these personas can be used to further improve the accuracy of other predictions made by the local installed platforms to enhance the switch terminal 12 or equivalent ability to make the appropriate recommendations for changes in the state of adaptive control systems, including but not limited to the illuminance relative to the specific occupant's or occupant's activity.

The local installed platforms responsible for computing this relationship can take into consideration the evolving nature of activity in an observed space, the identified building occupant's manual inputs to interfaces 20 and mobile devices 23 to adjust the level of illuminance in a space during any particular activity and continually improve the accuracy of the switch terminal 12 or equivalent recommendations. In one embodiment this can result in the continual enhancement of the switch terminal 12 or equivalent performances in delivering the adaptive control system experience in a space observed by the switch terminal 12 or equivalent.

In one embodiment, when one or more switch terminal 12 or equivalent are members of a single switch terminal 12 or equivalent that is not connected to an Network Systems 25 connection, one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the member devices, other similar first party devices 18, mobile devices 23, third party devices 18, and data created by local installed platforms on one or more of the member devices in the switch terminal 12 or equivalent to create a corpus of data upon which the local installed platforms on any one of the member devices can analyze and derive insights through the use of platforms algorithms that improve the local installed platforms accuracy in determining the identity of an occupant or occupants observed in a space.

As the accuracy of the one or more platforms can provide an ability to identify distinct people regularly perceived in a given observed space increase, these local installed platforms can then construct personas containing profile information about such occupants that include, among other information, the occupants desired lighting preferences for a particular space given a particular activity and time of day, and the regular movement patterns within a series of connected spaces for that occupant. Subsequently these personas can be used to further improve the accuracy of other predictions made by the local installed platforms to enhance the switch terminal 12 or equivalent ability to make the appropriate recommendations for changes of state of adaptive control systems, including but not limited to the illuminance relative to the specific occupant's or occupants' activity.

In one embodiment the local installed platforms responsible for computing this relationship can take into consideration the evolving nature of activity in an observed space, the identified building occupant's manual inputs to interfaces 20 and mobile devices 23 to adjust the level of illuminance in a space during any particular activity and continually improve the accuracy of the switch terminal 12 or equivalent's recommendations 72. This can result in the continual enhancement of switch terminal 12 or equivalent performances in delivering the adaptive control system experience in a space observed by any member of the switch terminal 12 or equivalent.

In one embodiment, when one or more switch terminal 12 or equivalent are members of a single switch terminal 12 or equivalent and that system is connected to the Network Systems 25, one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the member devices, other similar first party devices 18, mobile devices 23, Network Systems 25 devices 18, third party devices 18 and services accessible directly via Network Systems 25, third party control cloud services, third party devices 18 and services accessible via the network and Network Systems 25 connection and data created by local installed platforms on one or more of the devices 18 or first or third parties to create a corpus of data upon which those local installed platforms can analyze and derive insights through the use of platforms algorithms that improve the local installed platforms accuracy in determining the identity of an occupant or occupants observed in a space. As the accuracy of the one or more platforms 39' ability to identify distinct people regularly perceived in a given observed space increases, these local installed platforms can then construct personas containing profile information about such occupants that include, among other information, the occupants desired lighting preferences for a particular space given a particular activity and time of day, and the regular movement patterns within a series of connected spaces for that occupant. Subsequently these personas can be used to further improve the accuracy of other predictions made by the local installed platforms to enhance the switch terminal 12 or equivalent ability to make the appropriate recommendations for changes of state of adaptive control systems, including but not limited to the illuminance relative to the specific occupant's or occupants' activity.

In one embodiment the local installed platforms responsible for computing this relationship can include the evolving nature of activity in an observed space, the identified building occupant's manual inputs to interfaces 20 and mobile devices 23 to adjust the level of illuminance in a space during any particular activity and continually improve the accuracy of the switch terminal 12 or equivalent's recommendations 72. In one embodiment this can result in the continual enhancement of switch terminal 12 or equivalent performances in delivering the adaptive control system in a space observed by any member of the switch terminal 12 or equivalent.

In one embodiment, when two or more switch terminal 12 or equivalent are members of a single switch terminal 12 or equivalent that is not connected to an Network Systems 25 connection, one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the member devices, other similar first party devices 18, mobile devices 23, third party devices 18, and data created by local installed platforms on one or more of the member devices in switch terminal 12 or equivalent to create a corpus of data upon which the local installed platforms on any one of first or third party devices 18 can analyze and derive insights through the use of platforms algorithms that improve the local installed platforms accuracy in determining the spatial relationships of one observed space to other observed spaces within the same switch terminal 12 or equivalent. By assessing facets of the data, including but not limited to, intervals between recorded sensor data, building occupant interactions with interfaces, the movement of occupants, the local installed platforms can then construct two and optional three dimensional maps of the spaces observed by the switch terminal 12 or equivalent. The local installed platforms responsible for computing these space relationship will take into consideration the evolving composition of the switch 12 or system include the addition or removal of switch terminal 12 or equivalent, the nature of activity in the observed spaces, the identified building occupant's manual inputs to interfaces 20 and mobile devices 23 to adjust the state of adaptive control systems, including but not limited to the level of illuminance in a space during any particular activity and continually improve the accuracy of the switch terminal 12 or equivalent spatial mapping. As a non-limiting example this spatial map can be used by other local installed platforms to enhance the adaptive control system experience provided by the switch terminal 12 or equivalent.

In one embodiment, when one or more switch terminals 12 or equivalents are members of a single switch terminal 12 or equivalent and that system 10 is connected to the Network Systems 25. One or more of the local installed platforms on one or more of the devices 18 can collect and optionally summarize data received from sensors 15 integrated on one or any number of first party devices 18, data generated by a building occupant interaction with the switch terminal 12 or equivalent via interfaces 20 on one or any number of the member devices, other similar first party devices 18, mobile devices 23, Network Systems devices 18, and third party devices 18. This can create a corpus of data upon which those local installed platforms can analyze and derive insights through the use of platform algorithms that improve the local installed platforms accuracy in determining the spatial relationships of one observed space to other observed spaces within the same switch terminal 12 or equivalent.

By assessing facets of the data, including but not limited to, intervals between recorded sensor data, building occupant interactions with interfaces, the movement of occupants, the local installed platforms can then construct two and optional three dimensional maps of the spaces observed by the switch terminal 12 or equivalent. The local installed platforms responsible for computing these space relationship will take into consideration the evolving composition of the switch system 72 include the addition or removal of switch terminal 12 or equivalent, the nature of activity in the observed spaces, the identified building occupant's manual inputs to interfaces 20 and mobile devices 23 to adjust the state of adaptive control systems, including but not limited to the level of illuminance in a space during any particular activity and continually improve the accuracy of the switch terminal 12 or equivalent spatial mapping.

In one embodiment this spatial maps is used by other local installed platforms to enhance the adaptive control system experience provided by the switch terminal 12 or equivalent.

In one embodiment switch terminal 12 or equivalent or equivalent can provide remote learning on a cloud.

In one embodiment system terminal or equivalent can be used for illuminance levels.

In one embodiment, when a single switch terminal 12 or equivalent includes an ambient light sensor 15 and is connected to Network Systems 25 via networking technologies 25 on the same device 18 or if that switch terminal 12 or equivalent is a member of a switch terminal 12 or equivalent, then can alternatively be connected to the Internet via networking technologies, such as Network System on other devices 18 in the system 10, the local installed platforms 65 on the specific switch terminal 12 or equivalent to which the ambient light sensor is integrated, or if that switch terminal 12 or equivalent is a member of a switch terminal 12 or equivalent than the local installed platforms on any of the devices in that system can collect and optionally summarize illuminance data from the ambient light sensor on the original device, data created by locally installed platforms on any device 18 in the system that relate to the state of the power provided to the electrical lighting circuits 14 controlled by those devices, the load characteristics of lighting loads attached to any circuit attached to system 10 element which is then transferred to a remote server to be analyzed by a platform running on that remote machine or device 18 intended to generate a mathematical relationship between the light levels perceived by the ambient light sensor 16 on the original device 18 and the actual levels of light present in the space observed by the original device.

Additionally, this same data and computational results can be used to inform local installed platforms on any member of the switch system of the actual lighting characteristics, including how much power relates to the creation of how much light projected into the space is represented by any electrical lighting circuit connected to a switch terminal 12 or equivalent that is a member of the switch terminal 12 or equivalent. After the computation of these new results has been completed on the remote server, these results are then transferred back to the originating switch device 18 via its own Network Systems 25 connection, or if present via the Network Systems 25 connection of another switch terminal 12 or equivalent that is a member of the same switch terminal 12 or equivalent.

In one embodiment switch terminal 12 or equivalent or equivalent can be used for lighting preferences.

In one embodiment, when a single switch terminal 12 or equivalent is the sole member of a switch terminal 12 or equivalent and that devices connected to Network Systems 25 via networking technologies 68 on the same device, one or more of the local installed platforms on that device 18 can collect and optionally summarize data received from sensors 15 integrated into that device, data generated by a building occupant's interaction with the switch terminal 12 or equivalent system 10 via interfaces 20, mobile devices 23, and data created by local installed platforms to create a corpus of data which is then transferred to a remote server where platforms running on a remote machine can analyze and derive insights through the use of platforms algorithms that improve the local installed platforms accuracy in determining the relationship between an occupant's or occupant's activity in a specific space and their desired the state of adaptive control systems, including but not limited to the level of illumination in that space for a particular activity.

In one embodiment the remote platforms responsible for computing this relationship can include the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for changes in the state of adaptive control systems, including but not limited to the illuminance relative to the occupant's or occupants' activity, thus resulting in the continual enhancement of the switch terminal 12 or equivalent performance in delivering the adaptive control system experience in apace observed by the switch terminal 12 or equivalent.

After the computation of these new results has been completed on the remote server, these results are then transferred back to the originating switch terminal 12 via its own Network Systems 25 connection, or if present via the Network Systems 25 connection of another switch terminal 12 or equivalent that is a member of the same switch terminal 12 or equivalent.

In one embodiment, when one or more switch terminal 12 or equivalent are members of a single switch terminal 12 or equivalent that connected to Network Systems 25 via networking technologies on the same device 18 or if that switch terminal 12 or equivalent is a member of a switch terminal 12 or equivalent, then can alternatively be connected to the Internet via Network System 25 on other devices 18 in the system 10, one or more of the local installed platforms on one or more of the discrete member devices 18 can collect and optionally summarize data received from sensors 15 integrated on one or any number of the member devices, data generated by a building occupants interaction with the switch terminal 12 or equivalent via interfaces 20 on one or any number of the member devices, other similar first party devices 14, mobile devices 23, Network Systems 25, devices 18, backend 17, cloud system 21 and services accessible directly via a Network Systems 25, and data created by local installed platforms on one or more of the member devices in the switch terminal 12 or equivalent system 10 to create a corpus of data which is then transferred to a remote server where platforms running on a remote machine can analyze and derive insights through the use of platforms algorithms that improve the local installed platforms accuracy in determining the relationship between an occupant's or occupants' activity in a specific space and their desired state of adaptive control systems, including but not limited to the desired level of illumination in that space for a particular activity.

The remote platforms responsible for computing this relationship will take into consideration the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for the state of adaptive control systems, including but not limited to the for illuminance relative to the occupant's or occupants' activity, thus resulting in the continual enhancement of switch terminal 12 or equivalent performance in delivering the adaptive control system experience in a space observed by any member of the switch terminal 12 or equivalent.

After the computation of these new results has been completed on the remote server, these results are then transferred back to the originating switch device 18 via its own Network Systems 25 connection, or if present via the Network Systems 25 connection of another switch terminal 12 or equivalent that is a member of the same switch terminal 12 or equivalent.

In one embodiment, when one or more switch terminal 12 or equivalent are members of a single switch terminal 12 or equivalent that is connected to Network Systems 25 via networking technologies 68 on the same device 18 or if that switch terminal 12 or equivalent is a member of a switch terminal 12 or equivalent, then can alternatively be connected to the Internet via Network System 25 on other member devices in the system, one or more of the local installed platforms on one or more of the discrete member devices can collect and optionally summarize data received from sensors 15 integrated on one or any number of the member devices, data generated by a building occupants interaction with the switch terminal 12 or equivalent via interfaces 20 on one or any number of the member devices, other similar first party devices 14, mobile devices 23, Network Systems 25 devices 18, first party devices 18, third party devices 18 or services and services accessible directly via a Network Systems 25, create a corpus of data which is then transferred to a server where platforms running on a machine can analyze and derive insights through the use of platforms that improve the local installed platforms accuracy in determining the relationship between an occupant's or occupants' activity in a specific space and their desired state of adaptive control systems, including but not limited to the level of illumination in that space for a particular activity.

The remote platforms responsible for computing this relationship will take into consideration the evolving nature of activity in an observed space, the building occupant's manual inputs to interfaces 20 and mobile devices 23 to adjust the level of illuminance in a space during any particular activity and continually improve the accuracy of the switch terminal 12 or equivalent ability to make the appropriate recommendations for changes in the state of adaptive control systems, including but not limited to the illuminance relative to the occupant's or occupant's activity, thus resulting in the continual enhancement of switch terminal 12 or equivalent system performance in delivering the adaptive control system in a space observed by any member of the switch terminal 12 or equivalent. After the computation of these new results has been completed on the server, In one embodiment these results are then transferred back to the originating switch terminal 12 or equivalent via its own Network Systems 25 connection, or if present via the Network Systems 25 connection of another switch terminal 12 or equivalent that is a member of the same switch terminal 12 or equivalent.

Machine Learning Algorithm

Figure 8:
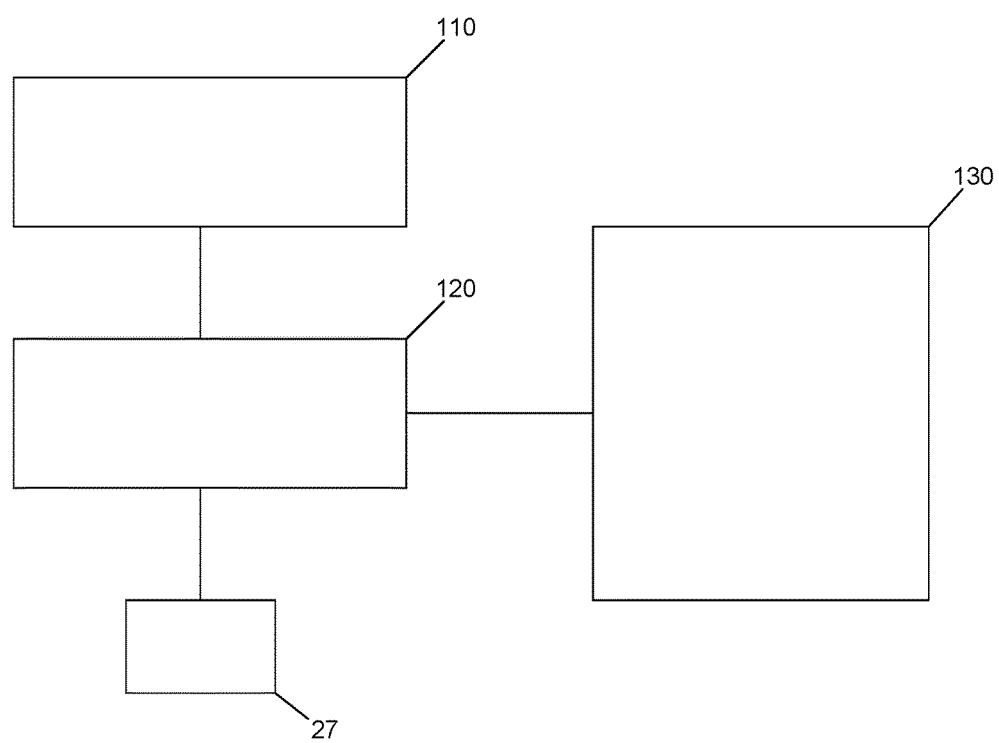
FIG. 8 illustrates one embodiment of a machine intelligence system that can be used with the present invention.

As illustrated in FIG. 8 as a non-limiting example in one embodiment system 10 uses a machine intelligence system 100 for extracting information relative to building occupant switch terminal parameters. In one embodiment system 100 is independent of system 10 and can be cloud based, at a backend end of system 10, and the like. In another embodiment system 100 is integrated with system 10. In one embodiment system 10, with the use of system 100, uses a combination of a logical inference with a statistical inference and then acts on a knowledge base to provide the platforms changes in operational instructions.

The machine learning algorithms provide one or more instructions for the operation of an adaptive control system relating to building automation relative to at least one of building occupant switch terminal parameters. In one embodiment system 10 uses platforms that are used by system 10 to build platforms by extracting patterns from larger datasets of a building occupant's patterns and behaviors relative to adaptive controls systems, including but not limited to load control devices and systems 22. As non-limiting examples system 10 uses machine learning analytics of one or more building occupants; for one or more of (i) learned types of activities a building occupant engages in as well the type of light the occupant uses; (ii) learned types of activities a building occupant engages in as well the type of light the occupant uses without the load control system 16; (iii) how many building occupants are associated with a building 15, types of activities, the desired use for those activities and devices 18, any or any kind of switch terminal activates parameters or actions; extracting information relative a building occupant's behavior relative to load control systems 22 and devices, for platforming, trends and behaviors of building occupants relative to switch terminals and any device 18 in a building, platforming, scoring building occupant data with platforms, forecasting and the like. In one embodiment system 100 maps parameters to an output. As a non-limiting example the platforms use observed parameters of a building occupant at switch terminal 12, or external to switch terminal 12, to make a selection of a control law. When the expected output is known, it is compared to an actual output from system 100. If these outputs match then we the selection is correct, and if not an error occurs, and the estimation of concept is updated. As a non-limiting example system 100 handles each selected and/or desired parameter of a building occupant and provides a sequential output.

In one embodiment a database 27 stores the information created by a building occupant that can then be included in a platform that can be provided in real time at the platforms center 110. In one embodiment the building occupant behaviors and/or actions information database section 120 stores relative building occupant behaviors and/or actions information in a variety of different formats. In one embodiment the building occupant behaviors and/or actions control learning unit 130 offers a range of the building occupant behaviors and/or actions information set from the building occupant behaviors and/or actions information database unit 103. In one embodiment the building occupant behaviors and/or actions learning control unit 130 may generate a control based on information that can distinguish between the normal states or the abnormal state through the learning of building occupant behaviors and/or actions activity in response to information input to one or more multi-layer neural network layers. In one embodiment the building occupant behaviors and/or actions control learning unit 130 receives building occupant behaviors and/or actions information in real time, as well as updated information that are saved in the database section 120 with the updated information being used to update reference information. As a non-limiting example this can be achieved for a set period of time, and the like. In addition, based on control information it may include state information based on the reference information of relative building occupant behaviors and/or actions information, and building automation. As a non-limiting example the building occupant behaviors and/or actions learning unit 130 may include different building occupant behaviors and/or actions steps. In one embodiment the building occupant behaviors and/or actions control learning unit 130 includes features that can set the criterion to building occupant behaviors and/or actions information input in real time and constantly update by using the building occupant behaviors and/or actions algorithm. In one embodiment the building occupant behaviors and/or actions control analysis section 116 is accessed and evaluated. In one embodiment the building occupant behaviors and/or actions control, analysis unit 116 may be generated in real time the building occupant behaviors and/or actions control information and comparative analysis of control based on the information. Information and Control based on information or updates in real time storage, including the adaptive control system status and zone status information 107.

As a non-limiting example the building occupant behaviors and/or actions control, analysis unit 116 may obtain a building occupant behaviors and/or actions control learning unit 130 using the results generated through the state probabilities 0.0 to 1.0.

Example of an NTB Algorithm

Figure 9:
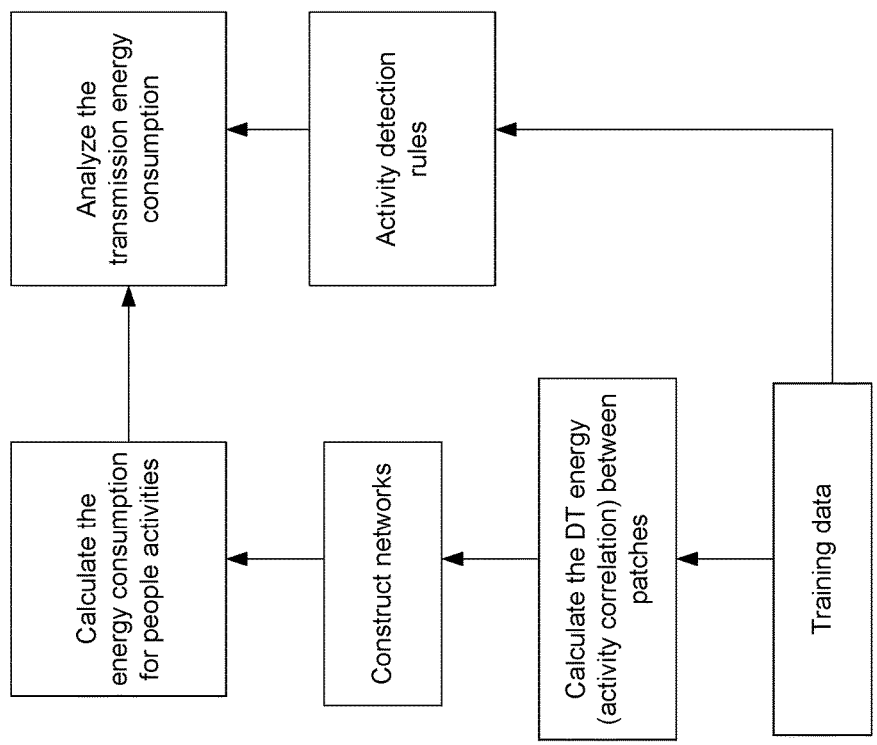
FIG. 9 illustrates one embodiment of an NTB algorithm that can be used with the present invention.
Figure 10A:
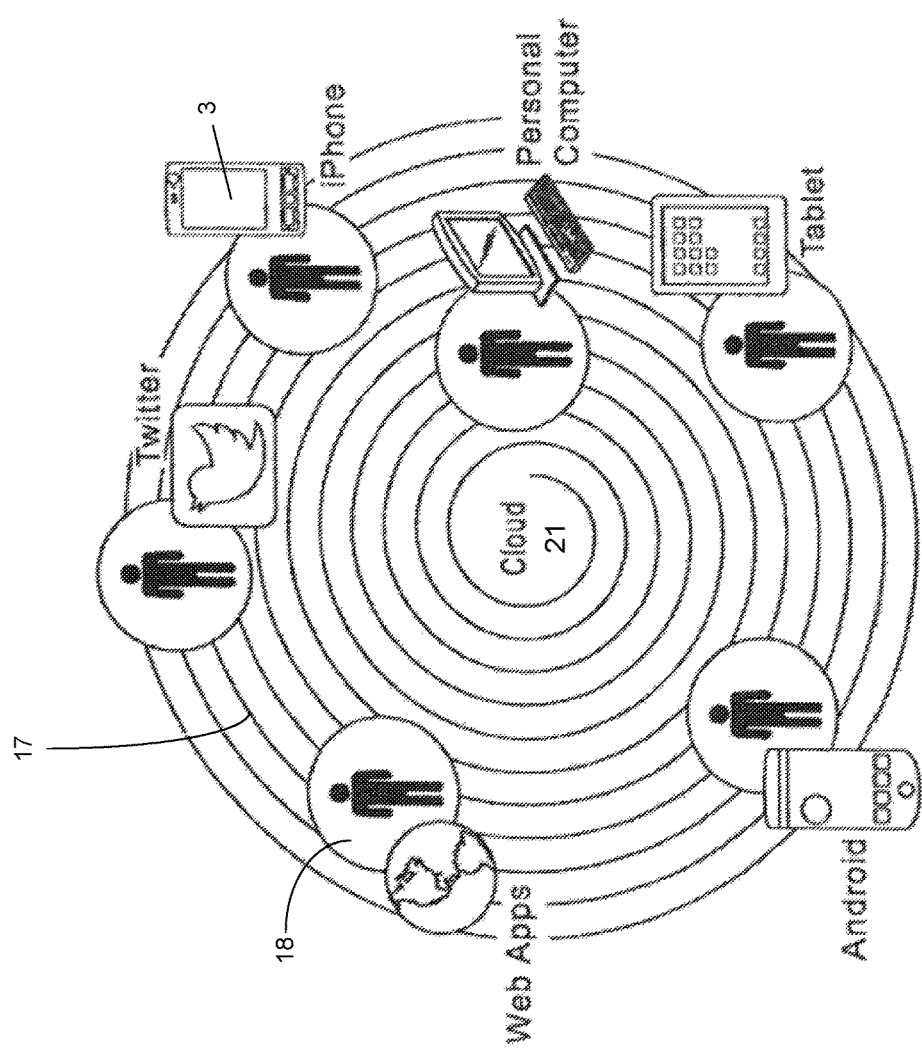
FIGS. 10 (*a*)-(*e*) illustrate one embodiment of a cloud infrastructure that can be used with the present invention.
Figure 10B:
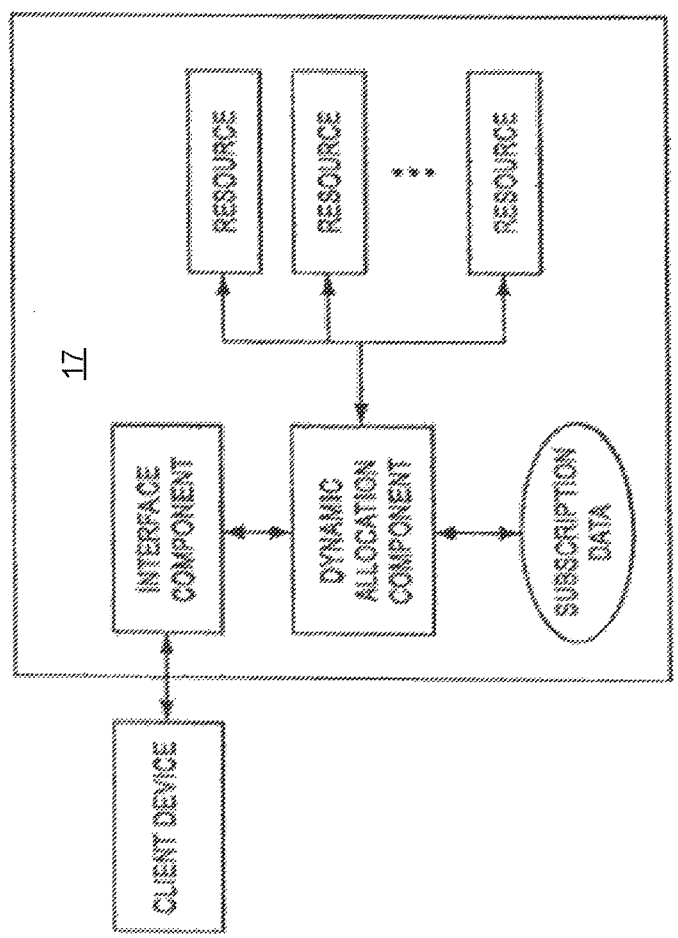
Figure 10C:
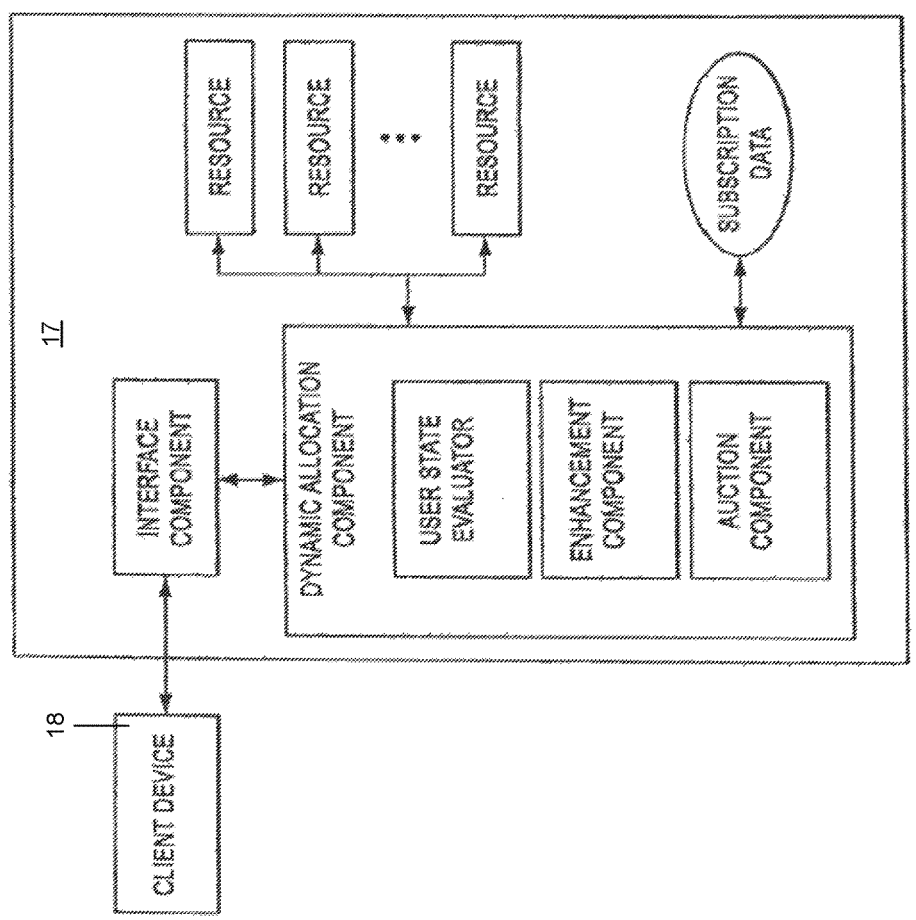
Figure 10D:
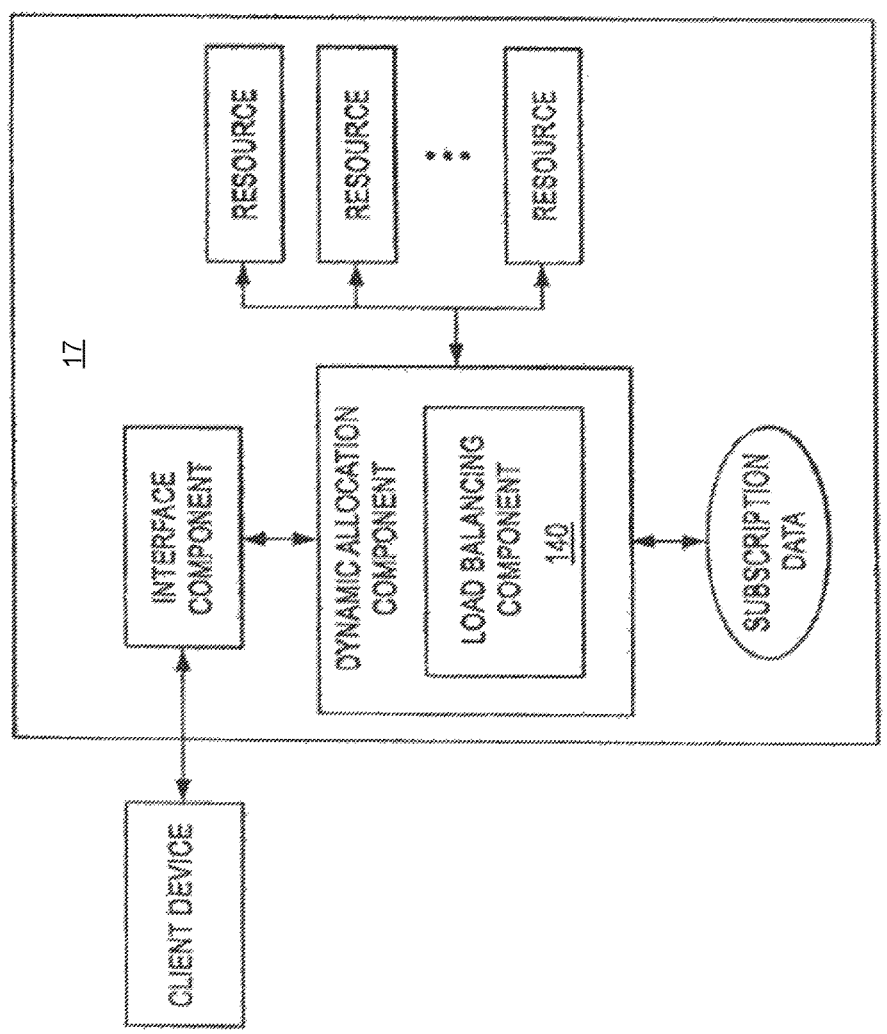
Figure 10E:
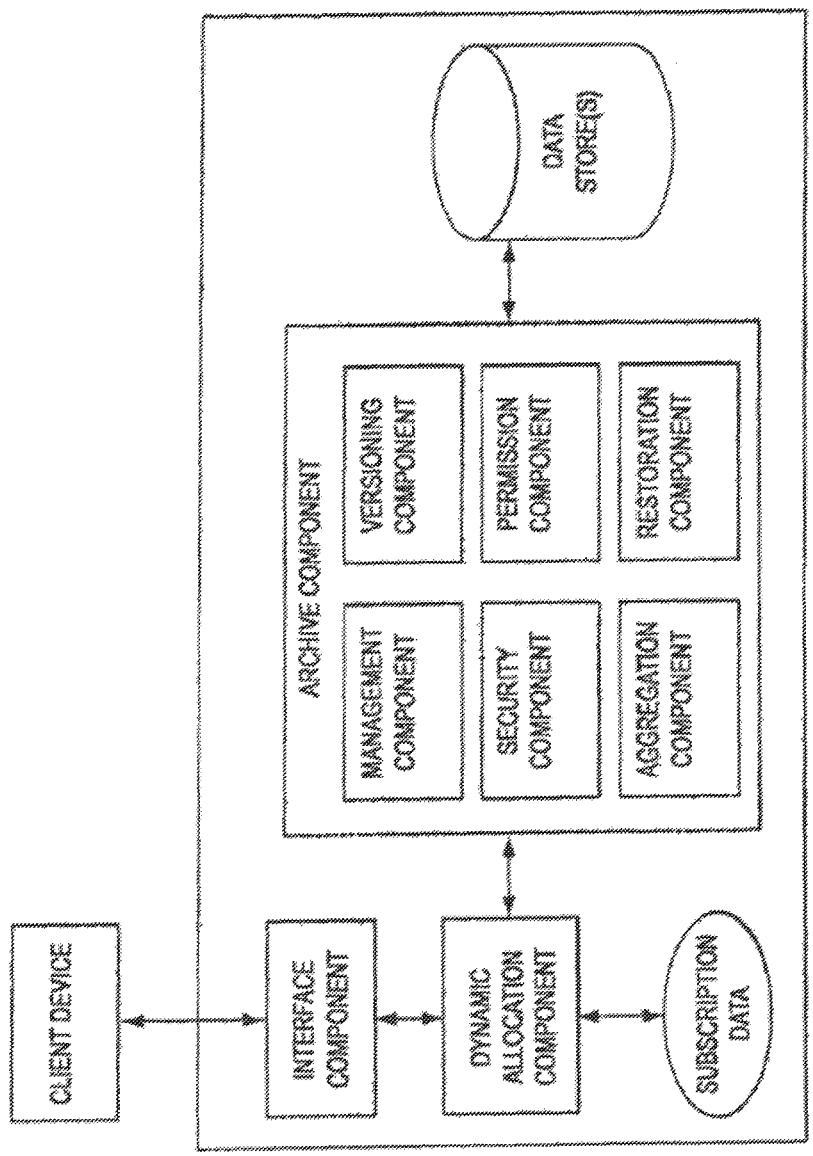

In one embodiment an NTB algorithm is used to provide machine learning analytics for extracting information relative to building occupant switch terminal parameters as illustrated in FIG. 9.

In one embodiment system the algorithm builds platforms by extracting patterns from larger datasets of a building occupant's patterns and behaviors relative to a building occupant and a switch terminal 12. As non-limiting examples system 10 uses machine learning analytics of one or more building occupants; for one or more of (i) learned types of activities a building occupant engages in as well the type of light the occupant uses; (ii) learned types of activities a building occupant engages in as well the type of light the occupant uses without the load control system 16; (iii) how many building occupants are associated with a building 13, types of activities, the desired use for those activities and devices 18, any or any kind of switch terminal activates or actions; extracting information relative a building occupant's behavior relative to load control systems 22 and devices, for platforming, trends and behaviors of building occupants relative to switch terminals and any device 18 in a building, platforming, scoring building occupant data with platforms, forecasting and the like.

In one embodiment the NTB algorithm divides a building 13 occupant's entire behavioral data into a plurality of patches relative to switch, including but not limited to switch terminal 12 or equivalents and devices, where each patch is modeled as a node in the error-free network. In response to this an individual's behaviors, to provide human activity recognition, are modeled as a package transmission process in the network. As a non-limiting example this can be a building occupant moving from one patch to another patch relative to a switch terminal 12 or equivalent can be modeled as a package transmitted from one node to another. In this way, various machine learning behavior recognition problems can be transferred into the package transmission analysis problem in the network.

As a non-limiting example the process of a building occupant moving among patches as the energy consumed to transmit a package is modeled, the activities are detected with transmission energy features. As a non-limiting example, abnormal activities can be detected if its energies deviate from normal activity transmission energy by larger than a pre-trained threshold. As a non-limiting example this can be if a building occupant moves to an unusual patch, the energy used is increased and this is detected as an abnormal activity. In this way, the abnormal detection problem can be modeled as the energy efficient transmission problem in a network.

In one embodiment, the following actions are taken: (a) divide the scene into patches. (b) model each patch in (a) as a node in the network and the edges between nodes are modeled as the activity correlation between the corresponding patches. The red trajectory R (u, q) in (a) is modeled by the red package transmission route in (b). (Note that (b) can be a fully connected network (i.e., each node has edges with all the other nodes in the network).

In one embodiment in order to ease the description only the four neighboring edges are drawn for each node). Furthermore, besides modeling the correlation between the building occupant and the scene the network-based model can also be easily extended for handling the interaction among people.

In one embodiment a relative network can be structured where one building occupant is always located in the center of the network and the movement of another building occupant can be modeled as the package transmission process in this "relative" network based on his relative movement to the network-center building occupant. In this way, the interaction among people can also be effectively recognized by evaluating different transmission energies in the network-based model.

In one embodiment the DT energy (activity correlation) is calculated and then an analysis is performed.

In one embodiment of the NTB algorithm modeling is performed as a node in a network. Activity correlations estimated based on the training data and these activity correlations can be used as the edge values in the network.

With these nodes and edges, the networks can be constructed. At the same time, the activity detection rules are also derived from a building occupant's data for detecting activities of interest during the testing process. In the testing process, after obtaining trajectories of people (which represent activities); their corresponding transmission energies are first calculated based on the constructed network.

These transmission energies are analyzed and the activity detection rules can be applied for detecting the activities. Furthermore, several things need to be mentioned about the NTB algorithm. Although there are other works trying to segment the scene into parts for activity recognition, the NTB algorithm is different from them in: (a) the NTB algorithm for a building occupant's behavior is constructed with a package transmission network over the patches while other works use graphical models for recognition. While the fixed structures of the graphical models may limit their ability to handle various unexpected cases the fully-connected transmission network is more general and flexible for handling various scenarios.

In one embodiment of activity rules an implementation can be different for different activity recognition scenarios. In one embodiment the NTB algorithm is utilized in abnormal event or scene-related activity detection, and group activity recognition. In one embodiment the NTB algorithm in abnormal event detects abnormal activities, including but not limited to a building occupant following irregular parameters and a building occupant moving.

In one embodiment the NTB algorithm divides the scene into parameters.

In one embodiment a building occupant activity or action is calculated as follows:

Let R (u, q) be the building occupant trajectory of the current activity with u being the starting patch and q being the building occupant's current patch. Also define the Direct Transmission (DT) energy for the edge between patches i and j as e(i, j) (i.e., the energy used by directly transmitting a package from patch i to j without passing through other patches, as can be described in detail in the next subsection). The total transmission energy for the trajectory R can be calculated by accumulating the DT energies of all patch pairs in the trajectory, as in $$E(u, q) = \sum_{(i,j) \in R(u,q)} e(i, j)$$

As a non-limiting example the total transmission energy R (u, q) equals to e (u, m)+e (m, n)+e (n, q). C. The DT energy (activity correlation) is calculated between patches. The edges between nodes in the network are modeled by the Direct Transmission (DT) energy between patches. In order to calculate the DT energy, an activity correlation AC is introduced between patches. When there are high chances for people to perform activities between two patches i and j (e.g., move across i and j), a high correlation AC (i, j) appears between these patches. Otherwise, a low correlation is. The activity correlation can be calculated by:

Thus, the activity correlation can be calculated by:

$$AC(i, j) = \sum_k tw_k(i, j)$$

Where AC (i, j) is the activity correlation between patches i and j. twk (i, j) is the correlation impact weight between i and j from the k-th trajectory in the training data. From this equation the activity correlation AC (i, j) is the summation of correlation impact weights twk (i, j) from the training trajectories. If more training trajectories indicate a high correlation between patches i and j, a large activity correlation AC (i, j) can be calculated. With the definition of AC (i, j), the DT energy e (i, j) between patches can be calculated by:

$$e(i,j) = 1/AC(i,j)$$

From this equation the DT energy is inversely proportional to the activity correlation. That is, when the activity correlation value AC (i, j) are larger between patches i and j, it implies that a "higher" activity correlation will appear between the patches, resulting in a "lower" DT energy. In this way normal activities (normally go across high-correlation patches) can result in smaller total energies. In one embodiment the correlation impact weights twk (i, j) are the key parts for calculating the DT energies.

In one embodiment switch terminal 12 or equivalent provides for adaptive dimming.

In one embodiment switch terminal 12 or equivalent makes all of decisions with its back-end without requiring the connection to cloud 21.

In one embodiment switch terminal 12 or equivalent provides for an adaptive building.

In one embodiment switch terminal 12 or equivalent is used for security. As non-limiting examples, this can be achieved using one or more of using: motion, microphones. Network System 25 connections, and the light to provide building 15 monitoring which is based, in one embodiment on load control devices 18.

In one embodiment switch terminal 12 or equivalent can be used for ambient assisted living.

In one embodiment switch terminal 12 or equivalent can used as a "Concierge" for an on star for a building 13. In one embodiment switch terminal 12 or equivalent can be used intercom via the light switch In one embodiment switch terminal 12 or equivalent can be used for any number of different Apps/Services that are run locally or on the cloud. Whether run locally or via the cloud.

In one embodiment switch terminal 12 or equivalent can be used auto dim for sleep.

In one embodiment switch terminal 12 or equivalent provides learning methods and systems for a building.

In one embodiment switch terminal 12 or equivalent provides lighting preferences.

In one embodiment switch terminal 12 or equivalent provides for illuminance levels.

In one embodiment switch terminal 12 or equivalent provides for lighting based on rules derived from machine learning.

In one embodiment switch terminal 12 or equivalent provides building occupant persona identification.

In one embodiment switch terminal 12 or equivalent provides building 13 space mapping.

As a non-limiting example, one embodiment of a cloud system is illustrated in FIGS. 10(a)-(e).

The cloud based system 21 includes a third party service provider that can concurrently service requests from several clients without building occupant perception of degraded computing performance as compared to conventional techniques where computational tasks can be performed upon a client or a server within a proprietary intranet. Alternative system 10 back end includes the elements and functions of cloud system 21.

The third party service provider (e.g., "cloud") supports 17 a collection of hardware and/or software resources. The hardware and/or software resources can be maintained by an off-premises party, and the resources can be accessed and utilized by identified building occupants over Network Systems. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

In one embodiment, the third party service provider can provide any number of resources such as servers, CPU's, data storage services, computational services, word processing services, electronic mail services, presentation services, spreadsheet services, web syndication services (e.g., subscribing to a RSS feed), and any other services or applications that are conventionally associated with personal computers and/or local servers. Further, utilization of any number of third party service providers 17 similar to the third party service provider is contemplated. According to an illustration, disparate third party service providers can be maintained by differing off-premise parties and a building occupant can employ, concurrently, at different times, and the like, all or a subset of the third party service providers By leveraging resources supported by the third party service provider, limitations commonly encountered with respect to hardware associated with clients and servers within proprietary intranets can be mitigated. Off-premises parties, instead of building occupants of clients or network administrators of servers within proprietary intranets, can maintain, troubleshoot, replace and update the hardware resources. Further, for example, lengthy downtimes can be mitigated by the third party service provider utilizing redundant resources; thus, if a subset of the resources are being updated or replaced, the remainder of the resources can be utilized to service requests from building occupants. According to this example, the resources can be modular in nature, and thus, resources can be added, removed, tested, modified, etc. while the remainder of the resources can support servicing building occupant requests. Moreover, hardware resources supported by the third party service provider can encounter fewer constraints with respect to storage, processing power, security, bandwidth, redundancy, graphical display rendering capabilities, etc. as compared to conventional hardware associated with clients and servers within proprietary intranets.

The cloud based system can include a client device 18 that employs resources of the third party service provider 17. Although one client device 18 is depicted, it is to be appreciated that the cloud based system can include any number of client devices similar to the client device, and the plurality of client devices can concurrently utilize supported resources. By way of illustration, the client device 18 can be a desktop device 18 (e.g., personal computer), motion/movement/gesture detection device, and the like. Further, the client device 18 is an embedded system that can be physically limited, and hence, it can be beneficial to leverage resources of the third party service provider 17.

Resources can be shared amongst a plurality of client devices subscribing to the third party service provider 17. According to an illustration, one of the resources can be at least one central processing unit (CPU), where CPU cycles can be employed to effectuate computational tasks requested by the client device. Pursuant to this illustration, the client device can is allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the building occupant of the client device. In accordance with another example, the resources can include data store(s) that can be employed by the client device to retain data. The building occupant employing the client device can have access to a portion of the data store(s) supported by the third party service provider 17, while access can be denied to remaining portions of the data store(s) (e.g., the data store(s) can selectively mask memory based upon building occupant/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable platform(s), etc. For instance, request(s) from the client device can relate to effectuating a computational task, storing/retrieving data, rendering a building occupant interface, and the like via employing one or more resources. Further, the interface component can obtain and/or transmit data over a network connection. As an illustration, executable code can be received and/or sent by the interface component over the network connection. Pursuant to another example, a building occupant (e.g. employing the client device) can issue commands via the interface component.

The cloud 21 provides for analysis of switch terminal parameters.

Moreover, the third party service provider includes a dynamic allocation component that apportions resources (e.g., hardware resource(s)) supported by the third party service provider to process and respond to the input(s) (e.g., request(s), data, executable platform(s) and the like) obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

Figure 11:
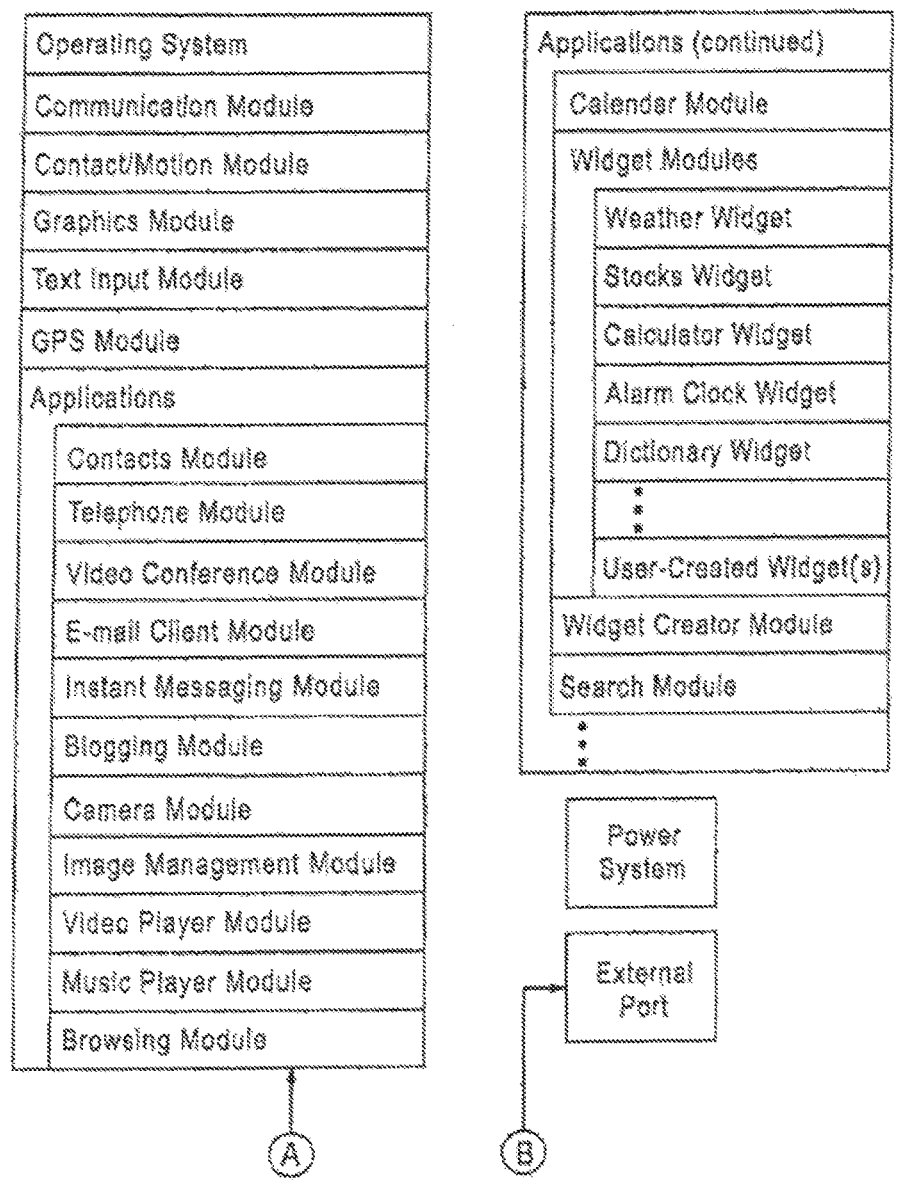
FIGS. 11-13 illustrate one embodiment of mobile devices that can be used with the present invention.
Figure 12:
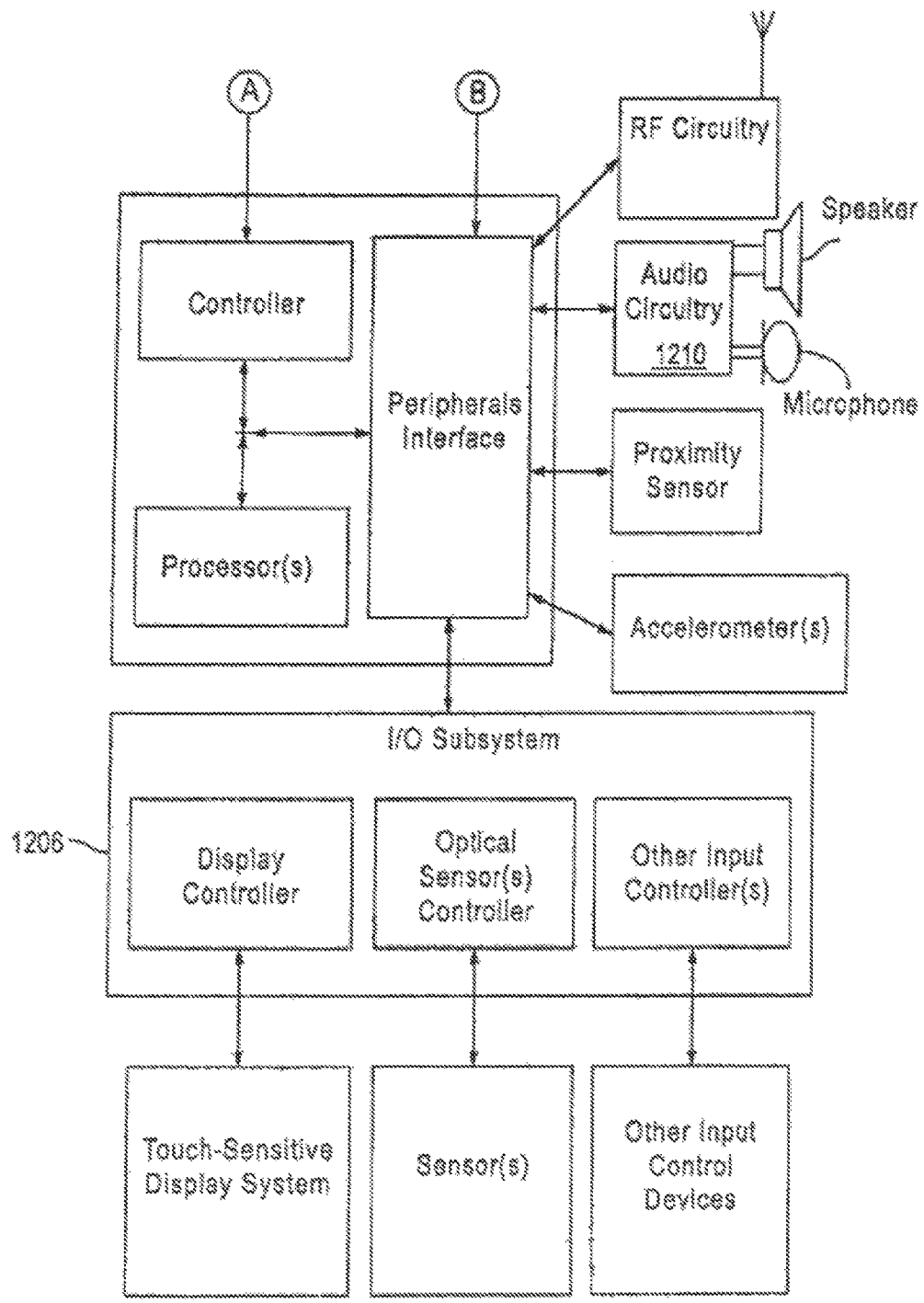
Figure 13:
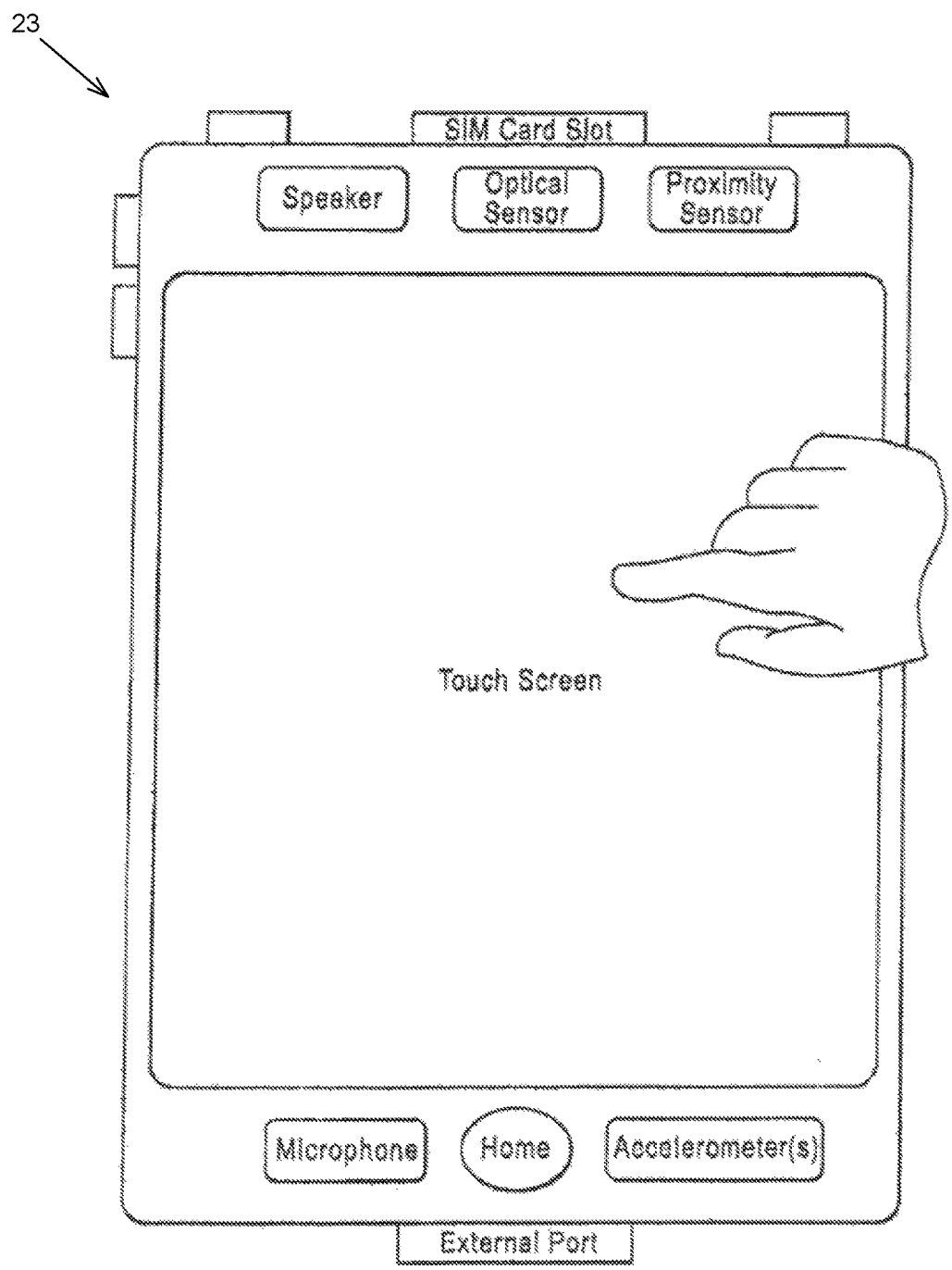

FIGS. 11-13 illustrate one embodiment of a mobile device 23 that can be used with the present invention.

The switch terminal 12 or equivalent 18 can include a display that can be a touch sensitive display. The touch-sensitive display is sometimes called a "touch screen" for convenience, and may also be known as or called a touch-sensitive display system. The switch terminal 12 or equivalent 18 may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The switch terminal 12 or equivalent 18 may include one or more optical sensors. These components may communicate over one or more communication buses or signal lines.

It should be appreciated that the switch terminal 12 or equivalent 18 is only one example of a portable multifunction switch terminal 12 or equivalent, and that the switch terminal 12 or equivalent 18 may have more or fewer components than shown, may combine two or more components, or a may have a different configuration or arrangement of the components. The various components may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the switch terminal 12 or equivalent, such as the CPU and the peripherals interface, may be controlled by the memory controller.

The peripherals interface couples the input and output peripherals of the device 18 to the CPU and memory. The one or more processors run or execute various software platforms and/or sets of instructions stored in memory to perform various functions for the switch terminal 12 or equivalent 18 and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications Network Systems and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with Network Systems and other devices by wireless communication.

The wireless communication may use any of a plurality of communications standards, protocols and technologies, including but not limited to Global System for Mobile Communications (GSM). Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a building occupant and the switch terminal 12 or equivalent. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. The I/O subsystem couples input/output peripherals on the switch terminal 12 or equivalent, such as the touch screen and other input/control devices, to the peripherals interface. The I/O subsystem may include a display controller and one or more input controllers for other input or control devices. The one or more input controllers receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port. USB port, and a pointer device 18 such as a mouse. The one or more buttons may include an up/down button for light control of the dimmer, volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device 18 by Performing Gestures on an Unlock Image." filed Dec. 23, 2005, which is hereby incorporated by reference in its entirety. A longer press of the push button may turn power to the computing device 18 on or off. The building occupant may be able to customize a functionality of one or more of the buttons. The touch screen is used to implement virtual or soft buttons and one or more soft keyboards.

The touch-sensitive sensor or touch screen provides an input interface and an output interface between the devices and a building occupant. The display controller receives and/or sends electrical signals from/to the touch screen. The touch screen displays visual output to the building occupant. The visual output may include graphics, text, icons, video, and any combination thereof (collectively termed "graphics"). In some embodiments, some or all of the visual output may correspond to building occupant-interface objects, further details of which are described below.

A touch screen has a touch-sensitive surface, sensor or set of sensors that accepts input from the building occupant based on haptic and/or tactile contact. The touch screen and the display controller (along with any associated modules and/or sets of instructions in memory) detect contact (and any movement or breaking of the contact) on the touch screen and converts the detected contact into interaction with building occupant-interface objects (e.g., one or more soft keys, icons, web pages or images) that are displayed on the touch screen. In an exemplary embodiment, a point of contact between a touch screen and the building occupant corresponds to a finger of the building occupant.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable switch terminal 12 or equivalent, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/816,862. "Multipoint Touchscreen." filed May 6, 2004; (3) U.S. patent application Ser. No. 10/903,964, "Gestures For Touch Sensitive Input Devices," filed Jul. 30, 2004; (4) U.S. patent application Ser. No. 11/048,254, "Gestures For Touch Sensitive Input Devices." filed Jan. 31, 2005; (5) U.S. patent application Ser. No. 11/038,590, "Mode-Based Graphical Building occupant Interfaces For Touch Sensitive Input Devices," filed Jan. 18, 2005; (6) U.S. patent application Ser. No. 11/228,758. "Virtual Input Device Placement On A Touch Screen Building occupant Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen display may have a resolution in excess of 1000 dpi. In an exemplary embodiment, the touch screen has a resolution of approximately 1020 dpi. The building occupant may make contact with the touch screen using any suitable object or appendage, such as a stylus, a finger, and so forth. In some embodiments, the building occupant interface is designed to work primarily with finger-based contacts, which are much less precise than stylus-based input due to the larger area of contact of a finger on the touch screen. In some embodiments, the device translates the rough finger-based input into a precise pointer/cursor position or command for performing the actions desired by the building occupant.

In some embodiments, in addition to the touch screen or instead of a touch screen, the switch terminal 12 or equivalent may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the switch terminal 12 or equivalent may include a physical or virtual click wheel as an input control device. A building occupant may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the building occupant may press down on at least a portion of the click wheel or an associated button. Building occupant commands and navigation commands provided by the building occupant via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to building occupant interaction with the device. In some embodiments, a virtual click wheel is displayed on the touch screen of a portable multifunction device and operated by building occupant contact with the touch screen.

The switch terminal 12 or equivalent also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The switch terminal 12 or equivalent may also include one or more sensors, including not limited to optical sensors. In one embodiment an optical sensor is coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module (also called a camera module); the optical sensor may capture still images or video. In some embodiments, an optical sensor is located on the front of the device so that the building occupant's image may be obtained for videoconferencing while the building occupant views the other video conference participants on the touch screen display. In some embodiments, the position of the optical sensor can be changed by the building occupant (e.g., by rotating the lens and the sensor in the device housing) so that a single optical sensor may be used along with the touch screen display for both video conferencing and still and/or video image acquisition.

The switch terminal 12 or equivalent may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/216,788, "Proximity Detector In Handheld Device." filed Sep. 30, 2005; Ser. No. 13/096,386, "Using Ambient Light Sensor To Augment Proximity Sensor Output"; Ser. No. 13/096,386, "Automated Response To And Sensing Of Building occupant Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the building occupants are not near the device 18.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over Network System.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

Notes:
1. METAL FRAME
2. PRINTED CIRCUIT BOARD
3. SLOT ANTENNA ELEMENT
4. FASTENERS
5. 2.4 GHZ RADIO IC
6. 915 MHZ RADIO IC
7. DIPLEXER
8. ANTENNA FEED POINT The dual-band slot antenna is integrated into the printed circuit board (2). The printed circuit board is attached to the metal frame (1) with fasteners. Electrical contact is made only at defined points between (1) and (2). The slot antenna element is void of all metal except at the feed point. The functional antenna is composed of all pieces shown in this assembly tuning and vswr performance depend on other components in the system (not shown). The antenna is used by two independent radio circuits simultaneously. This is achieved by using a diplexer circuit (combination low pass/high pass filter) to significantly attenuate signals from opposing radio circuits at the receivers. In this case the low pass filter is placed between the antenna and the 915 mhz radio. The high pass filter is placed between the antenna and the 2.4 ghz radio. This isolation prevents damage to the receiver circuit of each radio from the transmit power of the other radio. The filter circuits also help condition the incoming signal for each receiver. The feed point to the antenna is connected to the common terminal of the diplexer Dual Band Slot Antenna (See U.S. Pat. No. 6,765,538)

FIG. 2 is a frontal view of a dual band planar slot antenna according to the first embodiment of the present invention. The dual band slot antenna 2 consists of a conducting plate 20 in which a long slot 21 and a short slot 22 are formed. The long slot 21 is endowed with a characteristic length that provides resonance path for electromagnetic fields in a lower frequency band, and similarly the short slot 22 is endowed with a characteristic length that provides resonance path for electromagnetic fields in a higher frequency band. Preferably the conducting plate 20 elongates in a longitudinal direction along which the long slot 21 and the short slot 22 are both aligned. In the present embodiment the conducting plate 20 and the long slot 21 are rectangular, and the short slot 22 is trapezoid. The difference between a rectangular slot and a trapezoid slot is that a rectangular slot provides substantially one resonance length that results in a narrow bandwidth. But a trapezoid slot provides different resonance lengths reflected in its outline so that wider bandwidth can be obtained. A skilled artist in this field should observe that the conducting plate 20, the long slot 21 and the short slot 22 can have outlines other than those shown in FIG. 2.

The dual band slot antenna 2 further consists of a coaxial cable 25 for feeding signals. In the present embodiment, the coaxial cable 25 feeds directly across the long slot 21. This is done by connecting or welding the inner conductor and outer conductor of the coaxial cable 25 to the feed point 23 and the ground 24 of the slot antenna 2, respectively. When the cable 25 feeds the lower frequency band signals into the conducting plate 20, lower frequency resonance is created around the long slot 21 and electromagnetic waves carrying wireless signals are radiated away. By the same token, when the cable 25 feeds the higher frequency band signals into the conducting plate 20, higher frequency resonance is created around the short slot 22 that couples to the cable 25 and electromagnetic waves carrying wireless signals are radiated away.

FIG. 3 is a perspective view of the dual band planar slot antenna of FIG. 2 according to the first embodiment of the present invention. For the purpose of securely fixing the coaxial cable 25 onto the conducting plate 20, two supporting arms 241 and 241 are disposed on opposite sides of the outer conductor of the coaxial cable 25. The supporting arms 241 and 242 create a recession between them for receiving and precisely positioning the outer conductor on the ground 24. This is advantageous because a precise positioning of the cable 25 on ground 24 and feed point 23 greatly reduces variations in impedance and other antenna characteristics that may occur during manufacturing process if the cable 25 is displaced out of the desired contact points with the conducting plate 20. Furthermore, at the corners of the conducting plate 20 are disposed a pair of opening 261 and 262 that are used for mounting the antenna 2 onto mobile devices using fasteners such as screws or bolts.

FIG. 4 illustrates one example of installation of the dual band planar slot antenna 2 in a LCD panel of a laptop computer system of which only the display part is shown for simplicity. The liquid crystal display 31 is confined within the covering 33 of the LCD panel. A bracket 32 surrounds the display 31 and buttresses it as a structural support for providing rigidity to the covering 33 and the liquid crystal display 31 as a whole. The dual band slot antenna 2 is mounted on the bracket 32 at the left edge of the display 31 using screws 271 and 272 and thereby makes use of the space available between the covering 33 and the display 31. Though in this example the dual band slot antenna 2 is embedded in LCD panel, it is general knowledge of a skilled artist that the present invention is installable and applicable to other devices in other settings.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

The invention claimed is:

1. A system for controlling a first switch terminal of a building occupied by one or more building occupants, the system including a plurality of switch terminal parameters relative to the building, comprising:
    a first computer system positioned at the first switch terminal of the building at a first location of the building, the first computer system running on at least one platform;
    a first plurality of sensors coupled to the first switch terminal and the first computer system, at least a portion of the sensors are configured to provide signal data to the first computer system, the first computer system producing a command or data output that relates to at least one of: a command output for a local control system, a command output for a different system, a data output for a different system, a command output for a non-local device or a data output that is a non-local device, each of an output including learned data from that is based on a machine intelligence from previous data collected about patterns of a building occupant and used to provide an adaptive control system for the building;
    a second switch terminal;
    an interface at the first switch terminal configured to receive a command input from a building occupant and servers as interface a point of interaction between the first computer system and the building occupant, the interface selected from at least one of: touch, graphics, sound, position, movement, voice, communication, wireless, and radio;
    the first switch terminal and the second switch terminal interact and coordinate their operations to provide that the second switch terminal supplements building occupant behavior information obtained from the first switch terminal supplements to allow the first and second switch terminals to execute additional capabilities to provide outputs including learned data that is based on a machine intelligence from previous data collected about patterns of a building occupant and in response to the interaction and coordination there is adjustment of a property of the first switch terminal; and
    a power management system at the first switch.

2. The system of claim 1, further comprising:
    at least one interface coupled to the first switch terminal or equivalent and the first computer system configured to receive a command input.

3. The system of claim 2, wherein the at least one interface is at least one of: a touch interface, a voice interface and a wireless radio interface.

4. The system of claim 2, wherein the building occupant enters a change in a switch terminal parameter using the at least one interface.

5. The system of claim 2, wherein the first switch terminal or equivalent is configured to receive from a second switch terminal a data output that is used to create a command output that relates to the first switch terminal or a non-local device.

6. The system of claim 1, wherein the signal data is raw signal data.

7. The system of claim 1, wherein at least a portion of the sensors receive raw sensor data.

8. The system of claim 1, wherein the building occupant is a person who has access rights to the building.

9. The system of claim 8, wherein the building occupant does not occupy the building at all times of a selected time period.

10. The system of claim 8, wherein the building occupant enters and exits the building.

11. The system of claim 1, wherein a command is an instruction for a specific device to take an action.

12. The system of claim 11, wherein the specific device is the switch terminal or equivalent.

13. The system of claim 11, wherein the command is provided from at least one of: a mobile device, a cloud system, a third party system, or an input to the specific device.

14. The system of claim 2, wherein the command is provided by using a touch screen of a switch terminal interface.

15. The system of claim 1, wherein the command is provided by the building occupant.

16. The system of 1, wherein a data input is provided to at least a portion of the sensors.

17. The system of claim 1, wherein the data input is selected from at least one of: a processed sensor input from another device that is relevant to the system.

18. The system of claim 1, wherein the output command is to the switch terminal or equivalent.

19. The system of claim 1, wherein the output command is to a system device other than the switch terminal or equivalent.

20. The system of claim 1, wherein the output command is provided to a second system.

21. The system of claim 1, wherein the data input includes at least one of: a building occupant's presence in a room; a light level; system information relative to the switch terminal.

* * * * *